United States Patent
Arumugam

(10) Patent No.: US 11,686,584 B2
(45) Date of Patent: Jun. 27, 2023

(54) 3D LONG-RANGE THROUGH-THE-WALL MAGNETOQUASISTATIC COUPLING AND APPLICATION TO INDOOR POSITION SENSING

(71) Applicant: California Institute of Technology, Pasadena, CA (US)

(72) Inventor: Darmindra D. Arumugam, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 149 days.

(21) Appl. No.: 16/987,205

(22) Filed: Aug. 6, 2020

(65) Prior Publication Data

US 2021/0041245 A1 Feb. 11, 2021

Related U.S. Application Data

(60) Provisional application No. 62/883,738, filed on Aug. 7, 2019.

(51) Int. Cl.
  *G01C 21/20* (2006.01)
  *G01C 21/36* (2006.01)
  *G05D 1/02* (2020.01)

(52) U.S. Cl.
  CPC ....... *G01C 21/206* (2013.01); *G01C 21/3635* (2013.01); *G05D 1/0274* (2013.01)

(58) Field of Classification Search
  CPC .................................................. G01C 21/206
  See application file for complete search history.

(56) References Cited

U.S. PATENT DOCUMENTS

| 4,314,251 | A | 2/1982 | Raab |
| 6,249,680 | B1 | 6/2001 | Wax et al. |
| 6,703,829 | B2 * | 3/2004 | Tola ............... G01D 5/145 324/207.2 |
| 6,757,557 | B1 | 6/2004 | Bladen et al. |

(Continued)

FOREIGN PATENT DOCUMENTS

| CA | 3085334 A1 | 6/2019 | |
| JP | 5191975 B2 * | 5/2013 | ............. G03F 1/144 |

(Continued)

OTHER PUBLICATIONS

NPL, Arumugam, Darmindra, D., Through the Wall Magnetoquasistatic Ranging, IEEE Antenna and Wireless Propagation Letters, vol. 16, 2017 (hereinafter "Damindra").*

(Continued)

*Primary Examiner* — Jean Paul Cass
(74) *Attorney, Agent, or Firm* — Steinfl + Bruno, LLP

(57) ABSTRACT

Methods and systems for indoor position sensing are disclosed. The described methods and systems are based on magnetoquasistatic field coupling theory and can be implemented in two- and three-dimensional, long-range, through-the-wall applications, where the transmitting devices are implemented outdoor, the receiving device is implemented indoor, or vice versa. Measurement systems implemented to characterize the disclosed methods are also presented for both two- and three-dimensional applications involving indoor position sensing. Orientation sensing methods and systems are also disclosed.

26 Claims, 17 Drawing Sheets

(56) References Cited

U.S. PATENT DOCUMENTS

| | | |
|---|---|---|
| 6,789,043 B1 | 9/2004 | Nelson et al. |
| 7,289,913 B2 | 10/2007 | Schlicker et al. |
| 7,423,553 B2 | 9/2008 | Yokokohji et al. |
| 7,844,415 B1 | 11/2010 | Bryant et al. |
| 8,723,509 B2 | 5/2014 | Patterson, III et al. |
| 9,451,339 B2 | 9/2016 | Kauffman et al. |
| 9,638,521 B2 | 5/2017 | Arumugam |
| 10,244,421 B2 | 3/2019 | Rawlins |
| 10,352,680 B2 | 7/2019 | Arumugam |
| 10,697,752 B2 | 6/2020 | Arumugam |
| 11,313,892 B2 | 4/2022 | Arumugam |
| 2002/0158626 A1 | 10/2002 | Shay et al. |
| 2006/0267833 A1 | 11/2006 | Langford et al. |
| 2011/0316529 A1 | 12/2011 | Stancil et al. |
| 2013/0002275 A1 | 1/2013 | Min et al. |
| 2014/0266164 A1 | 9/2014 | Arumugam et al. |
| 2016/0097656 A1* | 4/2016 | Arumugam .......... G01S 1/08 324/207.17 |
| 2017/0067941 A1* | 3/2017 | Hegedus ............ G01R 19/0092 |
| 2017/0131080 A1 | 5/2017 | Arumugam et al. |
| 2018/0287262 A1* | 10/2018 | Patri .................. H01Q 13/02 |
| 2019/0130630 A1* | 5/2019 | Ackerson .............. G06T 7/0002 |
| 2019/0178622 A1 | 6/2019 | Arumugam |
| 2020/0088506 A1 | 3/2020 | Arumugam |
| 2021/0041245 A1* | 2/2021 | Arumugam ........ G01C 21/3635 |
| 2021/0132131 A1 | 5/2021 | Arumugam |

FOREIGN PATENT DOCUMENTS

| | | | |
|---|---|---|---|
| WO | WO-9311426 A1 * | 6/1993 | ............ G01B 7/105 |
| WO | 2018/191428 A1 | 10/2018 | |
| WO | 2019/118373 A1 | 6/2019 | |

OTHER PUBLICATIONS

Robinson, Ryan, K. et a., Correction of BO Eddy Current Effects in Spiral MRI, Wiley Online Library, (https://onlinelibrary.wiley.com/doi/full/10.1002/mrm.27583)(Nov. 16, 2018). (Year: 2018).*

Haus,HermannA.;Melcher,JamesR.(1989)."MagnetoquasistaticFields:SuperpositionIntegralandBoundaryValuePointsof View" (PDF).ElectromagneticFieldsandEnergy.PrenticeHall.p.310-370.ISBN978-0-13-249020-7.1989.*

Arumugam D. et al., "An active position sensing tag for sports visualization in American football," *2013 IEEE International Conference on RFID (RFID)*, Penang,2013, pp. 96-103.

Arumugam D. et al., "Through-the-wall indoor tracking and navigation using deep-sub-wavelength magnetoquasistatics," IEEE International Symposium on Antennas and Propagation USNC/URSI National Radio Science Meeting ,Jul. 2017, pp. 1409-1410.

Arumugam, Darmindra D. "Through-the-wall magnetoquasistatic ranging." IEEE Antennas and Wireless Propagation Letters 16, 2016. pp. 1439-1442. 4 pages.

Non-Final Office Action for U.S. Appl. No. 17/087,546, filed Nov. 2, 2020, on behalf of California Institute of Technology, dated Oct. 13, 2021. 33 Pages.

Raab, F.H., et al. "Magnetic position and orientation tracking system." IEEE Transactions on Aerospace and Electronic systems 5, Sep. 1979. pp. 709-718. 10 Pages.

Raab, F.H., et al., "Quasi-static magnetic-field technique for determining position and orientation." IEEE Transactions on Geoscience and Remote Sensing 4, Oct. 1981. pp. 235-243. 9 Pages.

Sheinker, A., et al., "Localization in 2D using beacons of low frequency magnetic field." IEEE Journal of Selected Topics in Applied Earth Observations and Remote Sensing 6.2, 2012. pp. 1020-1030. 11 Pages.

Abrudan, T. E., et al., "Distortion rejecting magneto-inductive three-dimensional localization (magloc)," IEEE Journal on Selected Areas in Communications, vol. 33, No. 11, pp. 2404-2417, Nov. 2015. 14 Pages.

Analog Devices. ADIS 16497 downloaded online from http://www.analog.com/en/products/mems/inertial-measurment-units/adis16497.html. Published 2017. 39 Pages.

Anderssen, R.S. et al., "Numerical Differentiation Procedures for Non-Exact Data", *Numerische Mathematik*, 22(3), pp. 157-182, Jan. 1972. 17 Pages.

Arumugam D. et al., "Decoupled magnetoquasistatic theory for long-range 3D positioning in on-line-of-sight environments" IEEE, Aug. 2015, 7 pages.

Arumugam, D. et al., "Higher Order Loop Corrections for Short Range Magnetoquasistatic Position Tracking", 2011 IEEE International Symposium on Antennas and Propagation (AP-S/URSI), pp. 1755-1757, (2011).

Arumugam, D., et al., "Long Range through-the-wall Magnetoquasistatic Coupling and Application to Indoor Positioning System," IEEE Antennas and Wireless Propagation Letters, vol. 19, Published Jan. 16, 2020. pp. 507-511. 5 Pages.

Arumugam D. et al., "Magnetoquasistatic position measurement above earth using the exact integral solutions" *Jet Propulsion Lab.*, Aug. 2015, 5 pages.

Arumugam D. "Magneto-Electric Quasi-Static (MEQS) Fields for Position and Orientation Sensing in Heavy Metallic Non-Line-of-Sight (NLoS) Environments" *NASA-Jet Propulsion Laboratory*, Jan. 2020, 13 pages.

Arumugam D. "Non-Line-of-Sight Quasistatic Localization" *NASA-Jet Propulsion Laboratory*, Feb. 2018, 4 pages.

Arumugam, D.D. et al., "Decoupled Range and Orientation Sensing in Long-Range Magnetoquasistatic Positioning", *IEEE Antennas and Wireless Propagation Letters*, 14, pp. 654-657, 2015. 4 Pages.

Arumugam, D.D. et al., "Error Reduction in Magnetoquasistatic Positioning Using Orthogonal Emitter Measurements", IEEE Antennas and Wireless Propagation Letters, vol. 11, pp. 1462-1465, (2012).

Arumugam, D.D. et al., "Experimental Demonstration of Complex Image Theory and Application to Position Measurement", IEEE Antennasand Wireless Propagation Letters, vol. 10, pp. 282-285, (2011).

Arumugam, D.D. et al., "Three-Dimensional Position and Orientation Measurements Using Magneto-Quasistatic Fields and Complex ImageTheory", IEEE Antennas and Propagation Magazine, vol. 56, No. 1, pp. 160-173, (Feb. 2014).

Arumugam, D.D. "Full-Wave Exact Integral Solutions of a Current Carrying Loop in a General Half-Space" *2013 IEEE Antennas and Propagation Society International Symposium (APSURSI)*, Institute of Electrical and Electronics Engineers. 2013. pp. 1038-1039. 3 pages.

Arumugam, D.D., "Single-Anchor 2-D Magnetoquasistatic Position Sensing for Short to Long Ranges Above-Ground", IEEE Antennas and Wireless Propagation Letters, 15, pp. 1325-1328, 2016. 4 Pages.

Arumugam, D.D., "Through-the-Wall Magnetoquasistatic Ranging", IEEE Antennas and Wireless Propagation Letters, vol. 16, pp. 1439-1442. 2017. 4 Pages.

Arumugam, et al., "Experimental study on the effects of groups of people on magnetoquasistatic positioning accuracy," in Antennas and Propagation Society International Symposium (APSURSI), 2012 IEEE, 2012, pp. 1-2.

Bannister et al. "Modified Image Theory Quasi-Static Range Subsurface-to-Subsurface and Subsurface-to-Air Propagation Equations" *NUSC Technical Report, Naval Underwater Systems Center*. Oct. 1977. No. 5647. 38 pages.

Blankenbach, J., et al., , "A robustand precise 3d indoor positioning system for harsh environments," in 2012 International Conference on Indoor Positioning and Indoor Navigation (IPIN), Nov. 2012, pp. 1-8. 8 Pages.

Blankenbach, J., et al.,., "Position estimation using artificial generated magnetic fields," in 2010 International Conference on Indoor Positioning and Indoor Navigation, Sep. 2010, pp. 1-5. 5 pages.

Bouwkamp, "Theoretical and numerical treatment of diffraction through a circular aperture," IEEE Trans. Antennas Propagation, vol. AP-18, pp. 152-176, Mar. 1970.

Calosso, C.E. et al., "Phase Noise and Amplitude Noise in DDS", 2012 IEEE International Frequency control Symposium Proceedings, pp. 1-6, May 2012. 6 pages.

(56) References Cited

OTHER PUBLICATIONS

De Angelis et al. "An Indoor AC Magnetic Positioning System" *IEEE Transactions on Instrumentation and Measurement, Institute of Electrical and Electronics Engineers*. May 2015. vol. 64, No. 5. pp. 1275-1283. 9 pages.

Denis, B. et al., "Impact of NLOS Propagation upon Ranging Precision in UWB Systems", IEEE Conferenceon Ultra Wideband Systems and Technologies, pp. 379-383, (Nov. 16-19, 2003).

Eggimann, "Higher-order evaluation of electro magnetic diffraction by circular disks," IRE Trans. Microwave Theory Tech., vol. MTI-9, pp. 408-418, Sep. 1961.

Euler, L. "De Serie Lambertina Plurimisqueeius Insignibus Proprietatibus",Acta Acad. Scient. Petropol., 2, pp. 29-51, (1783).

Fang, D.G. et al., "Discrete Image Theory for Horizontal Electric Dipoles in a Mulitlayered Medium", IEEE Proceedingson Microwaves,Antennasand Propagation, 135(5), pp. 297-303, (Oct. 1988).

International Preliminary Report on Patentability for International PCT Application No. PCT/US2018/027184 filed on Apr. 11, 2018 on behalf of California Institute of Technology dated Oct. 15, 2019 7 pages.

International Preliminary Report on Patentability for International PCT Application No. PCT/US2018/064798 filed on Dec. 10, 2018 on behalf of California Institute of Technology, dated Jun. 26, 2020. 9 Pages.

International Search Report for PCT Application No. PCT/US2018/064798 filed on Dec. 12, 2018 on behalf of California Institute of Technology, dated Apr. 30, 2019. 3 Pages.

International Search Report for PCT/US2018/027184 filed Apr. 11, 2018 on behalf of California Institute of Technology, dated Jul. 30, 2018. 3 pages.

Jiang, Z. et al., "NLOS GPS Signal Detection using a Dual-Polarisation Antenna", GPS Solutions, vol. 18, pp. 15-26, (2014).

Kalman, R.E. "A New Approach to Linear Filtering and Prediction Problems", Journal of Basic Engineering, 82(1), pp. 35-45, (1960). 12 pages.

Kalmus, H. P. , "A new guiding and tracking system," Aerospace and Navigational Electronics, IRE Transactionson, vol. ANE-9, No. 1, pp. 7-10, Mar. 1962. 4 Pages.

Koutsou, A.D. et al., "Preliminary Localization Results With an RFID Based Indoor Guiding System", Intelligent Signal Processing, IEEE International Symposium, pp. 1-6, (2007).

Kriezis, E.E. et al., "Eddy Current Distribution and Loss in a Semi-Infinite Conducting Space Due to a Vertical Current Loop", ETZ Archive, pp. 201-207, (Jul. 1979).

Macagno, E., Leonardian Mechanics: History of Kinematics, Inception of Modern Kinematics, Issue 112 of IIHR Monograph, Iowa Institute of Hydraulic Research, (1991). 137 pages.

Madgwick, S.O.H. et al., "Estimation of IMU and MARG Orientation using a Gradient Descent Algorithm",2011 IEEE International Conference on Rehabilitation Robotics, pp. 179-185, (Jun. 2011). 7 Pages.

Marins, J.L. et al., "An Extended Kalman Filter for Quaternion-Based Orientation Estimation Using MARG Sensors", Proceedings of the 2001 IEEE/RSJ International Conference on Intelligent Robots and Systems. Expanding the Societal Role of Robotics in the Next Millennium (Cat. No. 01CH37180), pp. 2003-2011, vol. 4, (2001). 10 pages.

Nilsson, M., "Kalman Filtering with Unknown Noise Covariances", Proc. Reglermote, KTH, Stockholm, Sweden, (May 2006). 4 pages.

Notice of Allowance for U.S. Appl. No. 15/339,663, filed Oct. 31, 2016 on behalf of California Institute of Technology, dated Apr. 3, 2019. 10 pages.

Notice of Allowance for U.S. Appl. No. 15/339,663, filed Oct. 31, 2016, on behalf of California Institute of Technology, dated Dec. 28, 2018. 10 pages.

Notice of Allowance for U.S. Appl. No. 16/470,189, filed Jun. 14, 2019 on behalf of California Institute of Technology, dated Mar. 5, 2020. 14 pages.

Notice of Allowance for U.S. Appl. No. 14/876,736, filed Oct. 6, 2015 on behalf of California Institute of Technology, dated Jan. 26, 2017. 9 pages.

Pasku, V., et al., "Magnetic field-based positioning systems," IEEE Communications Surveys Tutorials, vol. 19, No. 3, pp. 2003-2017, third quarter 2017. 15 Pages.

Pirkl, G., et al., "Robust, low cost indoor positioning using magnetic resonant coupling," in Proceedings of the 2012 ACM Conferenceon Ubiquitous Computing, ser. UbiComp'12. New York, NY, USA: ACM, 2012, pp. 431-440. [Online], Available: http://doi.acm.org/10.1145/2370216.2370281. 10 Pages.

Prigge, E. A., et al., "Signal architecture for a distributed magnetic local positioning system," IEEE Sensors Journal, vol. 4, No. 6, pp. 864-873, Dec. 2004. 10 Pages.

Raab, F. et al., "Magnetic Position and Orientation Tracking System", IEEE Transactions on Aerospace and Electronic Systems, vol. AES-15. No. 5, pp. 709-718, (Sep. 1979). 10 Pages.

Raab, F.H. "Quasi-Static Magnetic-Field Technique for Determining Position and Orientation", IEEE Transactions on Geo science and Remote Sensing, vol. GE-19, No. 4, pp. 235-243, (Oct. 1981).

Reynolds, M. "Low Frequency Indoor Radiolocation", Ph.D. Dissertation, Media Arts and Sciences, MIT, (2003). 141 pages.

Schweizer, J. et al., "Testing the Performance of Avalanche Transreceivers", Cold Regions Science and Technology, 37, pp. 429-438, (2003).

Sheinker, A., et al., "A method for indoor navigation based on magnetic beacons using smartphones and tablets,"Measurement 81, 197-209. 2016. 14 Pages.

Teixeira, T. et al., "A Survey of Human-Sensing: Methods for Detecting Presence, Count, Location, Track, and Identity", ENALAB, Yale University, Tech. Rep. Sep. 2010, (Sep. 2010). 42 pages.

Wait, J.R. "Image Theory of a Quasistatic Magnetic Dipole Over a dissipative half space" *Electronics Letters, Institute of Electrical and Electronics Engineers*. Jun. 1969. vol. 5, No. 13. pp 281-282. 3 pages.

Welch, G. et al., "Motion Tracking: No Silver Bullet, but a Respectable Arsenal", IEEE Computer Graphics and Applications, 22(6), pp. 24-38, (Nov./Dec. 2002). 15 Pages.

Woodman, O., "An Introduction to Inertial Navigation", Technical Report 696, University of Cambridge, (Aug. 2007). 37 pages.

Written Opinion for Interational PCT Application No. PCT/US2018/064798 filed on Dec. 12, 2018 on behalf of California Institute of Technology, dated Apr. 30, 2019. 7 Pages.

Written Opinion for PCT/US2018/027184 filed Apr. 11, 2018 on behalf of California Institute of Technology, dated Jul. 30, 2018. 6 pages.

Non-Final Office Action issued for U.S. Appl. No. 16/215,546, filed Dec. 10, 2018, on behalf of California Institute of Technology, dated Mar. 3, 2022. 16 Pages.

Notice of Allowance for U.S. Appl. No. 17/087,546, filed Nov. 2, 2020 on behalf of California Institute of Technology, dated Mar. 10, 2022. 9 Pages.

\* cited by examiner

800

|  | NONLINEAR | SIMPLIFIED |
|---|---|---|
| AVG X ERROR: | 0.4550 m | 0.56188 m |
| AVG Y ERROR: | 0.2996 m | 0.32116 m |
| AVG Z ERROR: | 0.6741 m | 0.60282 m |

*FIG. 8*

3D LONG-RANGE THROUGH-THE-WALL MAGNETOQUASISTATIC COUPLING AND APPLICATION TO INDOOR POSITION SENSING

CROSS REFERENCE TO RELATED APPLICATIONS

The present application claims priority to U.S. Prov. App. No. 62/883,738 filed on Aug. 7, 2019 and incorporated herein by reference in its entirety.

STATEMENT OF GOVERNMENT GRANT

This invention was made with government support under Grant No. 80NM0018D004 awarded by NASA (JPL). The government has certain rights in the invention.

INCORPORATION BY REFERENCE

All references and citations used throughout the present document, see e.g. references in square brackets and last paragraph of the specification, are incorporated herein by reference in their entirety.

FIELD

The present disclosure is related to indoor position sensing, and more particularly to methods and devices implementing long-range through-the-wall magnetoquasistatic coupling for three-dimensional (3D) indoor position sensing.

BACKGROUND

Magnetoquasistatic (MQS) fields (AC/DC, alternating/direct current signaling) are not perturbed by low-loss dielectrics and are effective for position sensing of a mobile device in indoor environments. Techniques using DC couplings require high drive-currents and result in short ranges (e.g., ≥12 A, ≤10 m) between transmitting (node) and receiving (device) devices. AC techniques that are limited to short ranges (≤10 m) are typically due to low-frequencies (≤10 kHz) and Faraday's law. Short range techniques need multiple indoor/interior nodes to track positions of a device over an entire house/building.

An exemplary system is one with multiple 2.5 kHz nodes each located inside an indoor environment. Related approaches with large number of indoor nodes and thus longer indoor ranges have also been used. A limitation of these techniques is the need for a fixed infrastructure in the indoor environment, which limits the broad applicability and increases the deployment cost of the technique.

To enable long range with fewer nodes, techniques using higher-frequencies have been investigated. As an example, an indoor-located node at 2 MHz has been shown to enable longer indoor ranges, but this required reliance on arbitrary power-law fitting to measured data due to the higher frequencies and multi-path and induced reflections from the environment. As a further example, a system comprising multiple nodes at 190 kHz located indoor or close to the outside of a wall (≤2 m) was used to demonstrate position sensing, however the technique relied on arbitrary power-law fitting and required a known/fixed orientation of both node and device. Although permitting an increase in range, these techniques did not remove or consider ground or large conductor effects and thus still required a fixed infrastructure of multiple sensors in the indoor environments, which again limits the broad applicability and increases the deployment cost of the technique.

SUMMARY

The disclosed methods, systems and devices address the described challenges and provide practical solutions to the above-mentioned problems.

Methods and systems to increase ranges and coverage to an entire large building or house (e.g., >8000 ft² house), from external nodes located far outside the building/house (e.g., >10-30 m from outer wall of house) are described. In order to achieve this, a bulk-conductivity theoretical model for the building is developed for magnetoquasistatic field-based position sensing inversions and ground effects are included into the theoretical developments to effectively model and enable the measurements for long-range applicability. Multi-axial quasi-static couplings are used to enable position and orientation sensing. Two-dimensional (2D) and three-dimensional (3D) position sensing is demonstrated inside the house, and an error analysis is presented.

The disclosed methods and systems increase ranges and coverage to an entire building/house/dwelling from a few external nodes located far outside the building/house (nodes located greater than 10-30 m from the outer wall of an indoor environment). To achieve this and to avoid requiring an arbitrary power-law fitting, theory based on bulk building conductivity has been developed and used along with corrections for ground effects to effectively increase ranges from the base/reference/anchor node to mobile devices located indoor, with one of more base/reference/anchor nodes located far outside the building or indoor environment.

Careful consideration of ground and bulk building conductivity and image models permit extended effective range, along with optimization of quasi-static frequencies of the system. Additionally, decoupled range from orientation- and direction-angles using is used by accounting for orthogonal multi-axial transmit/source and multi-axial receiver devices, enabling ranging that is invariant of the orientation/direction-angles of/to the device. Because the devices are located far from the building, the technique constitutes an indoor infrastructure-less configuration, where nodes can be positioned on a fire-vehicle, vehicle, or similar, not physically located in an indoor environment, and as a result increasing the value to multitude of applications without the need for large scale fixed deployments.

Additionally, the present disclosure describes a method and system to permit 3D position sensing of a mobile device in the indoor environment.

According to a first aspect of the present disclosure, a long-range, through-the-wall position sensing method is disclosed, comprising: providing one or more transmitting devices, each configured to transmit quasistatic magnetic fields along one or more transmitting axes; providing at least one receiving device configured to receive quasistatic magnetic fields along one or more receiving axes; placing the one or more transmitting devices outside an enclosed space having an outer wall; placing the at least one receiving device inside the enclosed space; transmitting through the outer wall, by the one or more transmitting devices, the quasistatic magnetic fields in one or more frequency bands; detecting, by the at least one receiving device, one or more quasistatic magnetic field couplings between each axis of each of the one or more transmitting axes and each axis of the one or more receiving axes, and based on the detected quasistatic magnetic fields, calculating orientation-invariant ranges between the at least one receiving device and each of the one or more transmitting devices.

According to a second aspect of the present disclosure, a long-range, through-the-wall position and orientation sensing method is disclosed, comprising: providing a transmitting device configured to transmit quasistatic magnetic fields along one or more transmitting axes; providing one or more receiving devices configured to receive quasistatic magnetic fields along one or more receiving axes of each of the one or more receiving devices; placing the transmitting device outside an enclosed space having an outer wall; placing the one or more receiving devices inside the enclosed space; transmitting through the outer wall, by the transmitting device, the quasistatic magnetic fields in one or more frequency bands; detecting, by each of the one or more receiving devices, one or more quasistatic magnetic field couplings between each axis of each of the transmitting device and each axis of the one or more receiving axes of the one or more receiving devices, and based on the detected quasistatic magnetic fields, calculating: ranges between the transmitting device and each of the one or more receiving devices; angular directions to each of the one or more receiving devices; and orientation of each of the one or more receiving devices.

Further aspects of the disclosure are provided in the description, drawings and claims of the present application.

DESCRIPTION OF THE DRAWINGS

FIG. 8 shows a table summarizing exemplary measurements results according to embodiments of the present disclosure.

DETAILED DESCRIPTION

Throughout the disclosure, the terms "long-range" and "through-the-wall" are used to describe the position sensing applications where the transmitting and receiving devices are set up outside and inside (or the other way around) of an enclosed area (such as a dwelling) and where the transmitting device is located at a distance larger than 10 m from an outer wall of the enclosed area, the outer wall being in between the transmitting and receiving device such that the transmitted fields travel through the wall to reach the receiving device.

Figure 1:
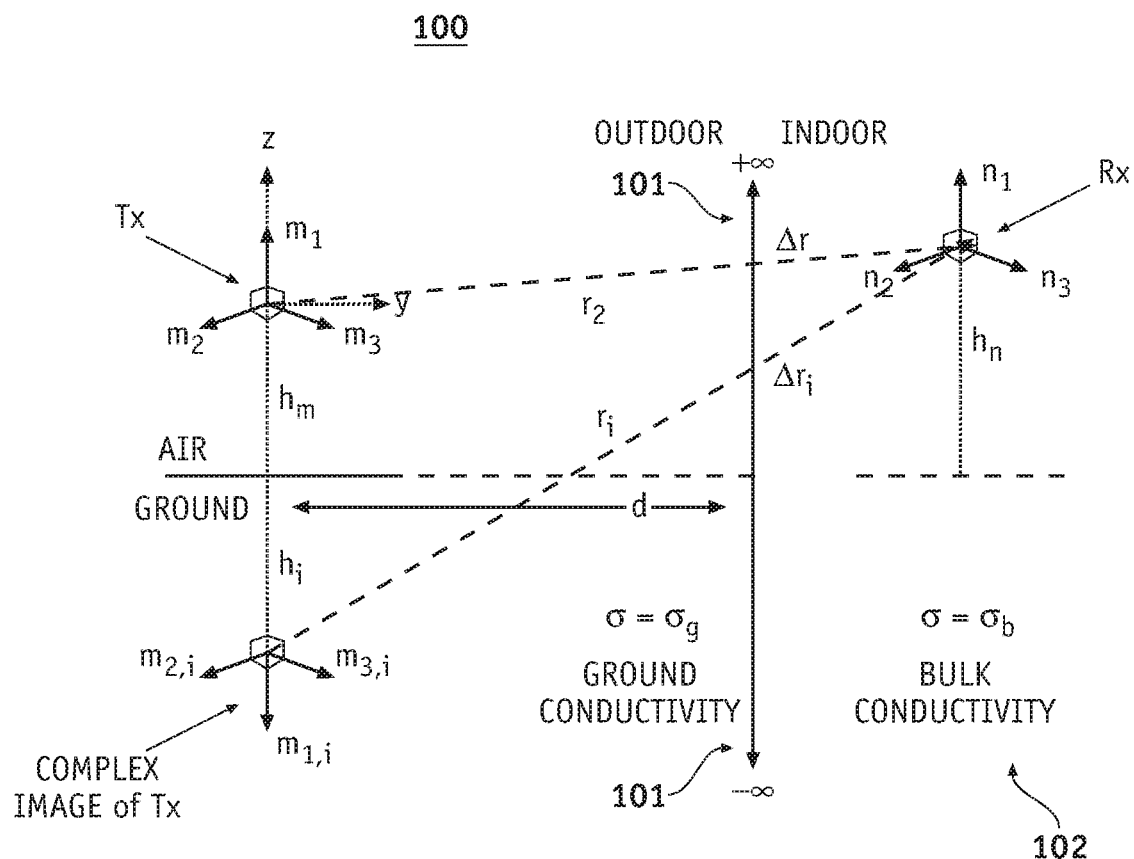
FIG. 1 shows an exemplary measurement arrangement comprising transmitting and receiving devices according to an embodiment of the present disclosure.

FIG. 1 shows an exemplary measurement arrangement (100) in accordance with an embodiment of the present disclosure. Measurement arrangement (100) comprises a transmitting device (Tx) located outside a dwelling (102) and a receiving device (Rx) positioned inside the dwelling. Transmitting device (Tx) is set up at a height ($h_m$) above the ground and at a horizontal distance (d) from outer wall (101) of the dwelling (102). Receiving device (Rx) is set up at a height ($h_n$) from the ground and inside the dwelling. Also shown are the orthogonal 3-axis MQS transmitter moments ($m_1$, $m_2$, $m_3$) and the orthogonal 3-axis receiver moments ($n_1$, $n_2$, $n_3$). The complex image theory moments ($m_{1,i}$, $m_{2,i}$, $m_{3,i}$) corresponding to the transmitting device (Tx) are also shown in FIG. 1.

With further reference to FIG. 1, transmitting device (Tx) comprises three orthogonal coils, each generating a unique magneto-quasi-static (MQS) field, and similarly, receiving device (Rx) comprises three orthogonal detection coils. The field sensed inside the dwelling is dominated by the source (shifted in location) and due to an exponential attenuation (or loss) that is only amplitude dependent as shown in [1]. The voltage measured at a small receive coil inside the dwelling is given by $V=-j\omega[\vec{B}\cdot\hat{n}]a'$ and by combining [3] and [1], the following is obtained:

$$V_T \approx -j\frac{\omega\mu_o a\prime}{4\pi}\left[e^{-\alpha\kappa\Delta r}\frac{3(\hat{m}\cdot\hat{r})(\hat{n}\cdot\hat{r}) - \hat{m}\cdot\hat{n}}{r^3} + e^{-\alpha\kappa\Delta r_i}\frac{3(\hat{m}_i\cdot\hat{r}_i)(\hat{n}\cdot\hat{r}_i) - \hat{m}_i\cdot\hat{n}}{r_i^3}\right], \quad (1)$$

where $\vec{B}$ is the vector magnetic field of an electrically-small coil driven by a current, $\hat{m}$ and $\hat{n}$ represents the surface normal unit vectors for transmitting and receiving devices (Tx, Rx) respectively, $\omega$ is the radial frequency, the subscript i denotes the complex image contributions for ground effects, $\alpha'$ is the receive coil's area, $|\vec{m}|=1$ Am$^2$, r and $r_i$ represent the distance from the transmitting device (Tx) and the complex image of the transmitting device (Tx) to the receiving device (Rx) respectively. The exponential function from [1] may be applied to both source and image terms, where $\alpha\kappa=\alpha/\delta_b(1-j)$ is a scaling of the inverse complex skin-depth, where $\delta_b=\sqrt{2/\omega\mu\sigma_b}$. The vector image range is approximately $\vec{r}_i=(h_m+h_i)\hat{z}+\rho\hat{\rho}$, where $h_i=h_m+\delta_g(1-j)$, $\rho$ represents the cylindrical coordinate, and $\delta_g=\sqrt{2/\omega\mu\sigma_g}$. For the 2D case and for long-ranges ($\rho>>h_m+h_i$), the vertical dipole moments along the z-axis can be neglected due to image cancellation as shown in FIG. 1, and $\hat{m}_{2-3}\cdot\hat{z}=\hat{m}_{2-3,i}\cdot\hat{z}=\hat{n}_{2-3}\cdot\hat{z}=0$, and $\hat{m}_{2-3}=\hat{m}_{2-3,i}$ [2].

Continuing with the calculations above, the 2D long-range operation permits the simplification $\Delta r_i\approx\Delta r$. By using steps in [2], the total voltage can be then simplified to give:

$$V_T \approx C_g e^{-\alpha\kappa\Delta r}[3(\hat{m}\cdot\hat{\rho})(\hat{n}\cdot\hat{\rho})C_\phi - \hat{m}\cdot\hat{n}]\times\left[\frac{1}{r^3}+\frac{1}{r_i^3}\right], \quad (2)$$

where $C_g$ is a field-coupling gain, $C_\phi \approx(\rho/r)^2\to 1$ at long-ranges [2], and (2) is valid for all dipole configurations. The complex shift (multiplier of internal distance) can be neglected due to internal ranges ($\Delta r$, $\Delta r_i$) that are small relative to skin-depth ($\delta_b$) [1], so the total range, r and $r_i$, are given by [2].

Orientation-Invariant Range Dependence

The coupling in equation (2) above shows dependence on orientation, which may complicate the range-dependent field drop-off analysis. To remove this dependence and study the field power spreading/attenuation, the approach in [2] may be used to sum the squared components of all combinations of field couplings in FIG. 1. Since the z-components are negligible for long-ranges, as noted previously, the solution is given by:

$$F_r = \sum_{m_q, n_k} V^2(m_q, n_k) \approx C_{sg} e^{-\alpha \Delta r} \left[ \frac{1}{r^3} + \frac{1}{r_i^3} \right]^2, \quad (3)$$

$$= C_{sg} e^{-\alpha H(r-d)} \left[ \frac{1}{r^3} + \frac{1}{r_i^3} \right]^2,$$

where the steps in [2] are used, $C_{sg}=5C_g^2$ is the system gain, and the complex attenuation constant is defined as $\alpha=2\alpha\kappa$. For the 2D case studied here, $\Delta r \approx H(\rho-d) \approx H(r-d)$, since $\rho \approx r$, where $H(x)$ represents the Heaviside unit step function of x.

Description of Exemplary Electronics Implementations in Arrangement (100) of FIG. 1

In what follows, exemplary electronic elements to implement the measurement arrangement (100) of FIG. 1 are described, although the person skilled in the art will understand that varieties of other electronic devices may also be envisaged when implementing such measurement arrangements in accordance with the teachings of the present disclosure.

With reference to FIG. 1, measurement arrangement (100) may include two fixed-location tri-axial transmitting devices, a mobile receiving device, and a processing system (not shown). Each transmitting device may include three orthogonal square coils. Signaling for each coil is obtained from a Novatech DDS9m signal generator. These signals are fed into FET (field-effect transistor) gate drivers, powered at, for example, 24V, to drive the coils with high current. The coils in each axis are all resonated with cylindrical high-voltage mica capacitors that can withstand high currents without dissipating excess heat. A first transmitting device is made up of about 30 turns of 18-AWG copper magnet wire wound sparsely around a 32×32×32 cm cube made up of polycarbonate sheets. The first transmitting device is resonated and programmed to transmit MQS fields in the X, Y, and Z axes at 101.0, 92.4, and 70.55 kHz, respectively. A second transmitter may be identically constructed, however using a more portable antenna made up of 50 turns of 18-AWG copper magnet wire wound tightly around a 13.5×13.5×13.5 cm acrylic cube. The second transmitting device may be resonated and programmed to transmit in the X, Y, and Z axes at 76.8, 68.6, and 60.0 kHz, respectively. The receiving device was fabricated with about 2.5×5×0.5 inch in size, excluding the battery system.

Figure 2:
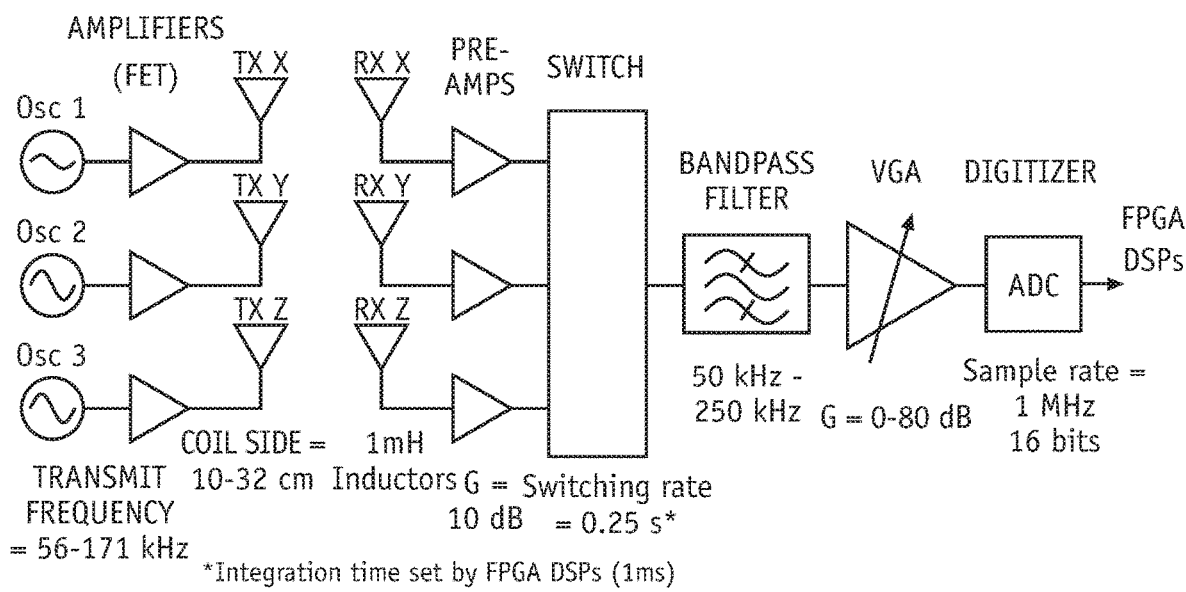
FIG. 2 show exemplary transmitting and receiving devices according to an embodiment of the present disclosure.

FIG. 2 shows a system block diagram (200) representing an exemplary combination of transmitting and receiving devices in accordance with an embodiment of the present disclosure. A set of three magnetically-loaded inductors may be utilized as pickup antennas to maximize portability. The signals received by each of the RX coils are sent through a low-noise pre-amplifier before being multiplexed/switched. The output is band-pass filtered. A series of low noise op-amps and differential amplifiers buffer the signal before it is digitized by a 16-bit ADC (analog-to-digital conversion) at a sampling rate of 1 MSPS. The receiver's DSP (digital signal processing) engine may be designed to scale with the number of transmitting devices. The DSP reads the ADC output of the current channel, mixes with an I/Q NCO (numerically controlled oscillator) at the specified frequency with a sum-and-dump filter followed by a CORDIC (factor combining) stage. After a time specified by the operator, the receiver switches to the next available channel, and re-starts the processing. The switch may be set to have a dwell time of 250 ms per channel and an integration time of 1 ms per sample. The result is a reduction in the output data rate (set by the length of the accumulator), providing magnitude solutions for each of the frequencies specified to the DSP engine. Further processing can be completed by a short FFT (Fast Fourier Transform) to correct for imbalance in the unsynchronized clock domains. As part of this study, the data was directly transferred to MATLAB® (a mathematical tool) via Xilinx's ILA (integrated logic analyzer) module, and processed using the sum-of-squares method after the unknown losses and gains in each axis/link are calibrated or removed.

In what follows, some exemplary measurement results highlighting the performance of the disclosed methods and devices will be presented.

Measurement Configuration

Figure 3:
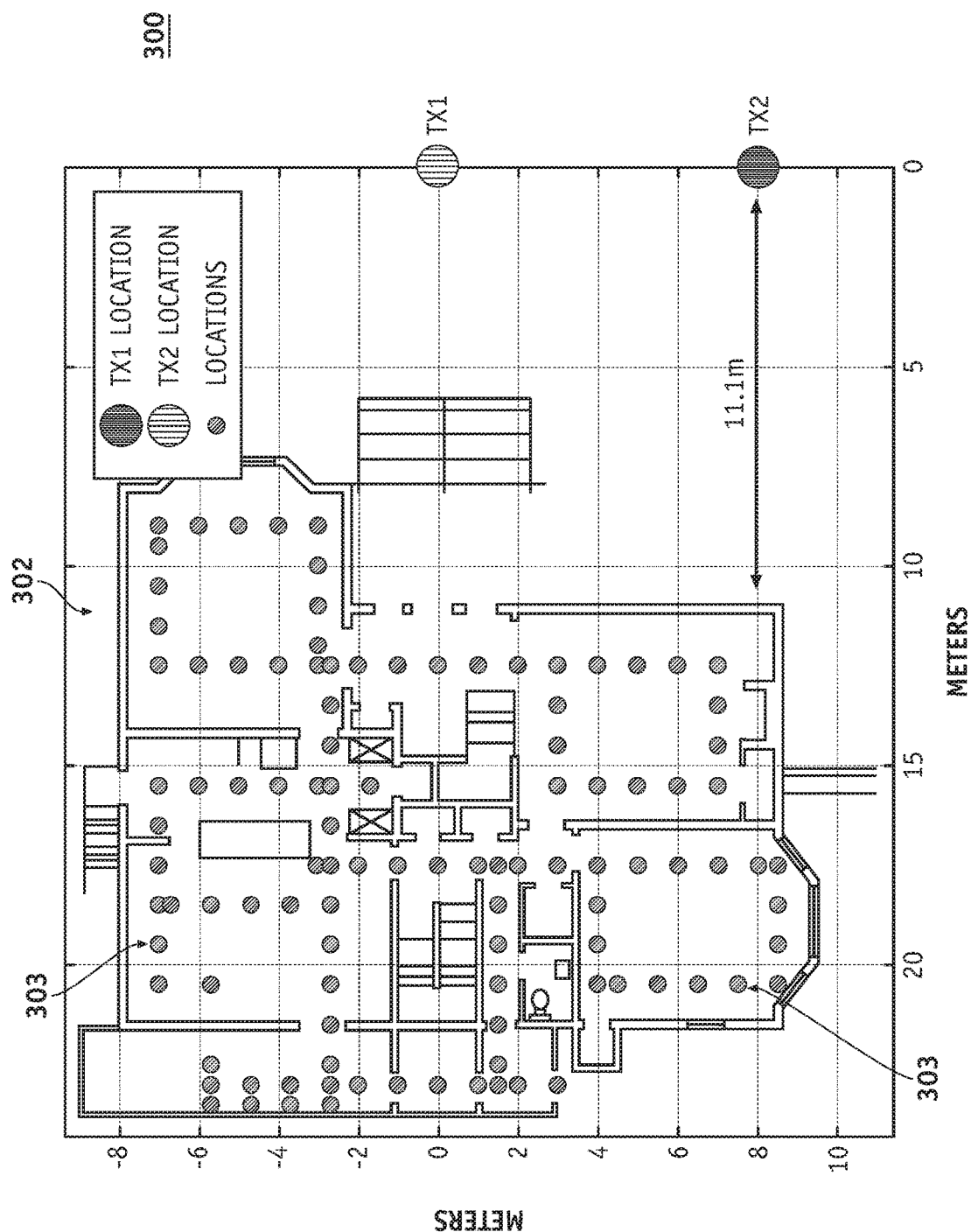
FIG. 3 shows an exemplary measurement arrangement according to an embodiment of the present disclosure.

FIG. 3 shows an exemplary measurement arrangement (300) according to further embodiments of the present disclosure. Two transmitting device (Tx1, Tx2) are used as part of the measurements in a larger than 8000 square feet house in an urban environment in West Los Angeles, Calif. In the exemplary embodiment of FIG. 3, transmitting device is located 11.1 m from the outer wall of the house, and the two transmitting devices (Tx1, Tx2) are located 8 m apart.

With continued reference to FIG. 3, static (no motion) receive measurement locations throughout the interior of the house (302) are used. A total of 117 interior locations were surveyed relative to an external predefined origin collocated with transmitting device (Tx1). A floor plan was co-registered to the measurement grid and origin. FIG. 3 shows all surveyed locations (303) inside the house, along with overlay of the floor plan, and the locations of the two transmitting devices (Tx1, Tx2). At each surveyed location (303) in the interior, the receiving device is positioned almost horizontally and left to be static prior to data collection. The transmitting and receiving devices are both located at a height of about 2 m above ground. Data is retrieved-by and stored-in the laptop connected to the receiving device.

Field Power Model Analysis

Figure 4A:
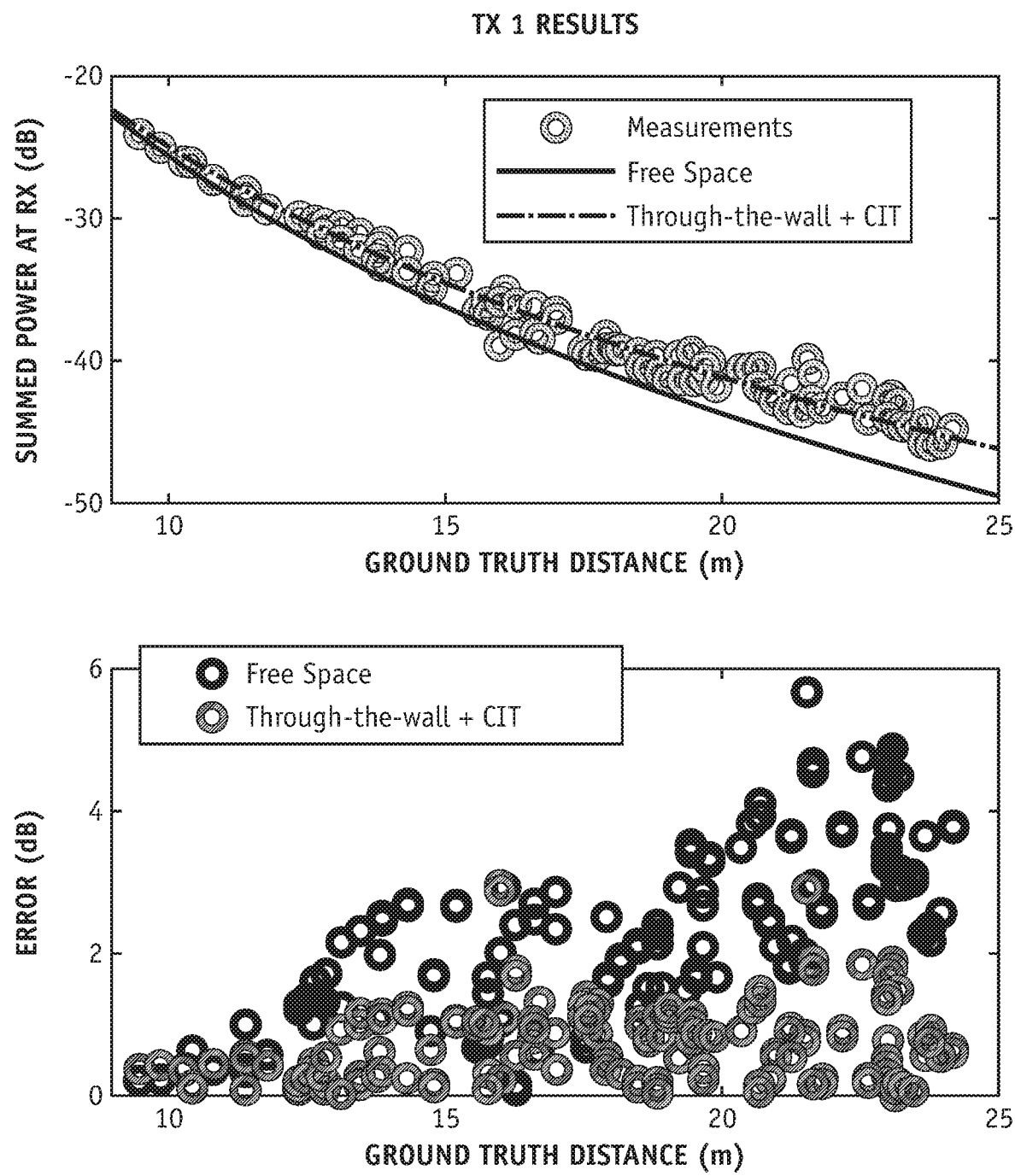
FIGS. 4A-4B show exemplary measurement results according to embodiments of the present disclosure.
Figure 4B:
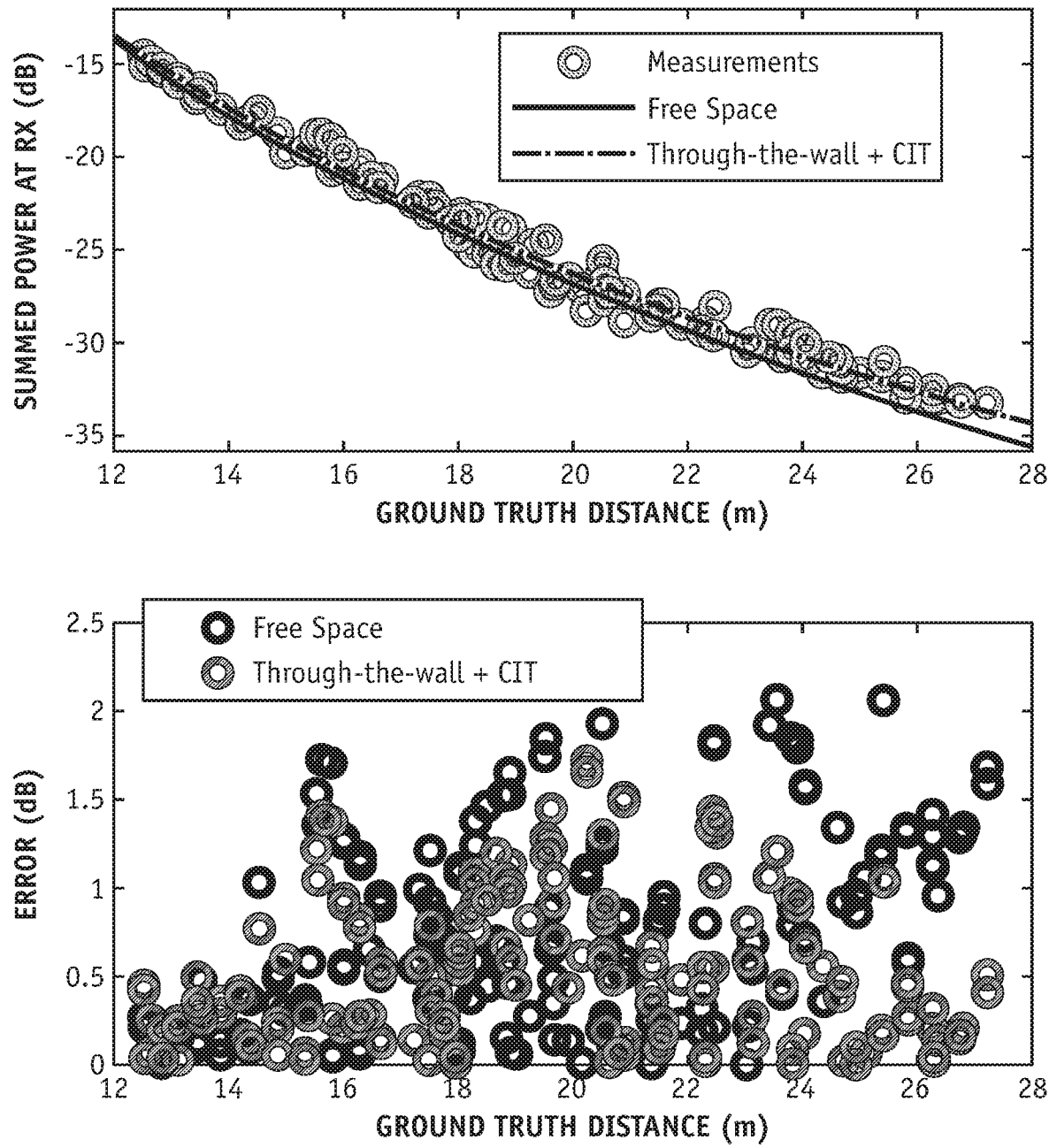

In order to show the effectiveness of the disclosed model, data using the summed power of equation (3) for all points in the building was collected (at surveyed points (303) of FIG. 3), and graphed as a function of the relative ground truth range (range of each surveyed point from the transmitters). The result is shown in FIG. 4A for transmitting device (Tx1) of FIG. 3 and FIG. 4B for transmitting device (Tx2) of FIG. 3.

The $C_{sg}$ system gain constant in equation (3) may be found based on a laboratory calibration of all system gains. The $\alpha$ (which is used to derive $\sigma_b$ of the house) and the $\delta_g$ (which is used to derive $\sigma_g$ of the ground) constants are found using a numerical least-squares minimization of equation (3) to the data collected. The results show that the model agrees well with the data collected in the house. The constants derived give a ground and building conductivity of $\sigma_g \approx 9\text{-}16$ mS/m and $\sigma_b < 4$ nS/m, respectively. The through-the-wall model with complex image theory (CIT) to account for ground effects as given by equation (3) shows an average improvement of 0.2-1.4 dB (mean) over the free-space theory from transmitting devices (Tx1, Tx2) of FIG. 3.

2D Position Sensing Results and Analysis

Referring back to FIG. 3, by numerically inverting measured power between both transmitting devices (Tx1, Tx2) and the mobile receiving device for the respective ranges using equation (3), the 2D position of the device can be found by solving the 2D trilateration problem.

Figure 5A:
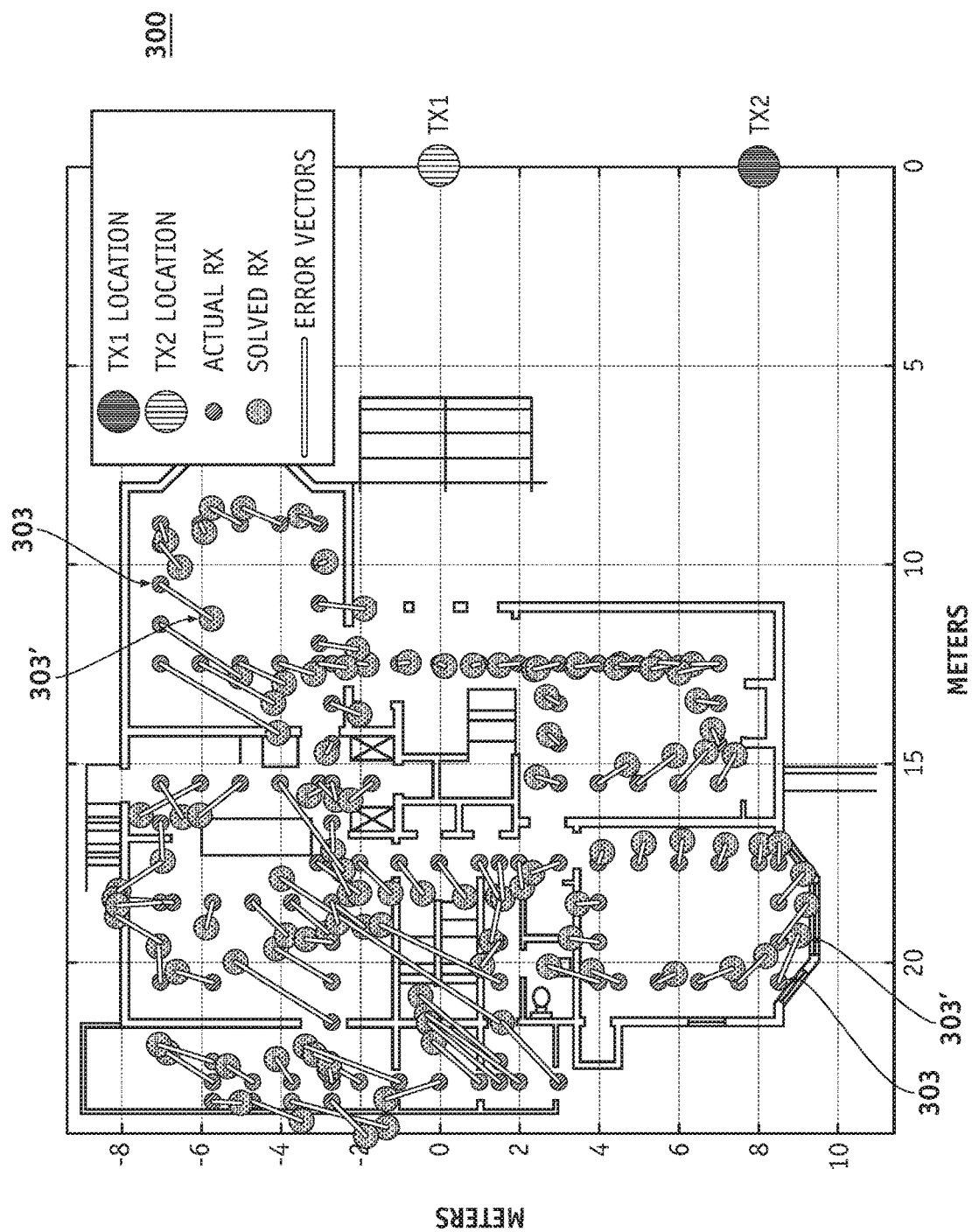
FIGS. 5A-5C show exemplary measurement results according to embodiments of the present disclosure.

FIG. 5A is a reproduction of FIG. 3 further showing, this time, the solved or inverted position at each point with the floor plan underlayed on the figure. Both the actual surveyed points (303) and the corresponding location is estimated by the model (equation (3)) are shown. The transmitters locations are also noted in the figure. The estimation error for each point is represented by a line connecting each surveyed point (303) to its corresponding estimation (303').

Figure 5B:
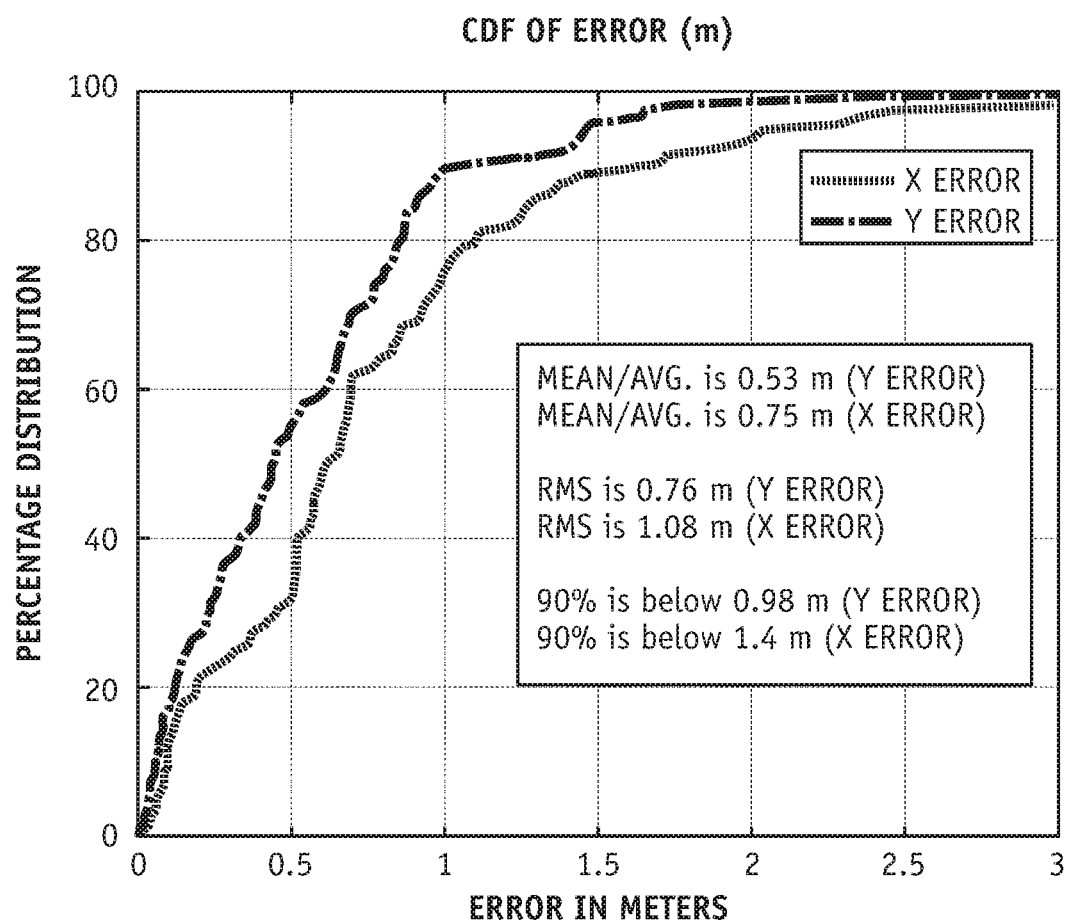

FIG. 5B shows the cumulative error distribution of all points shown in FIG. 5A. The mean and RMS (root-mean-squared) error were found to be 0.53 m and 0.76 m for all y-locations and 0.75 m and 1.08 m for all x-locations. About 90% of measurements show error below 0.98 m and 1.4 m for y-locations and x-locations, respectively. However, the worst-case peak error is found to be 3.5 m and 5.4 m for y-locations and x-locations, respectively With further reference to FIG. 5A, in order study repeatability, the mobile receiver is located at 25 different locations inside the house (sub-set of surveyed locations (303)) and 20 repeat measurements were conducted at each location, which are all inverted and studied for repeatability or biases.

Figure 5C:
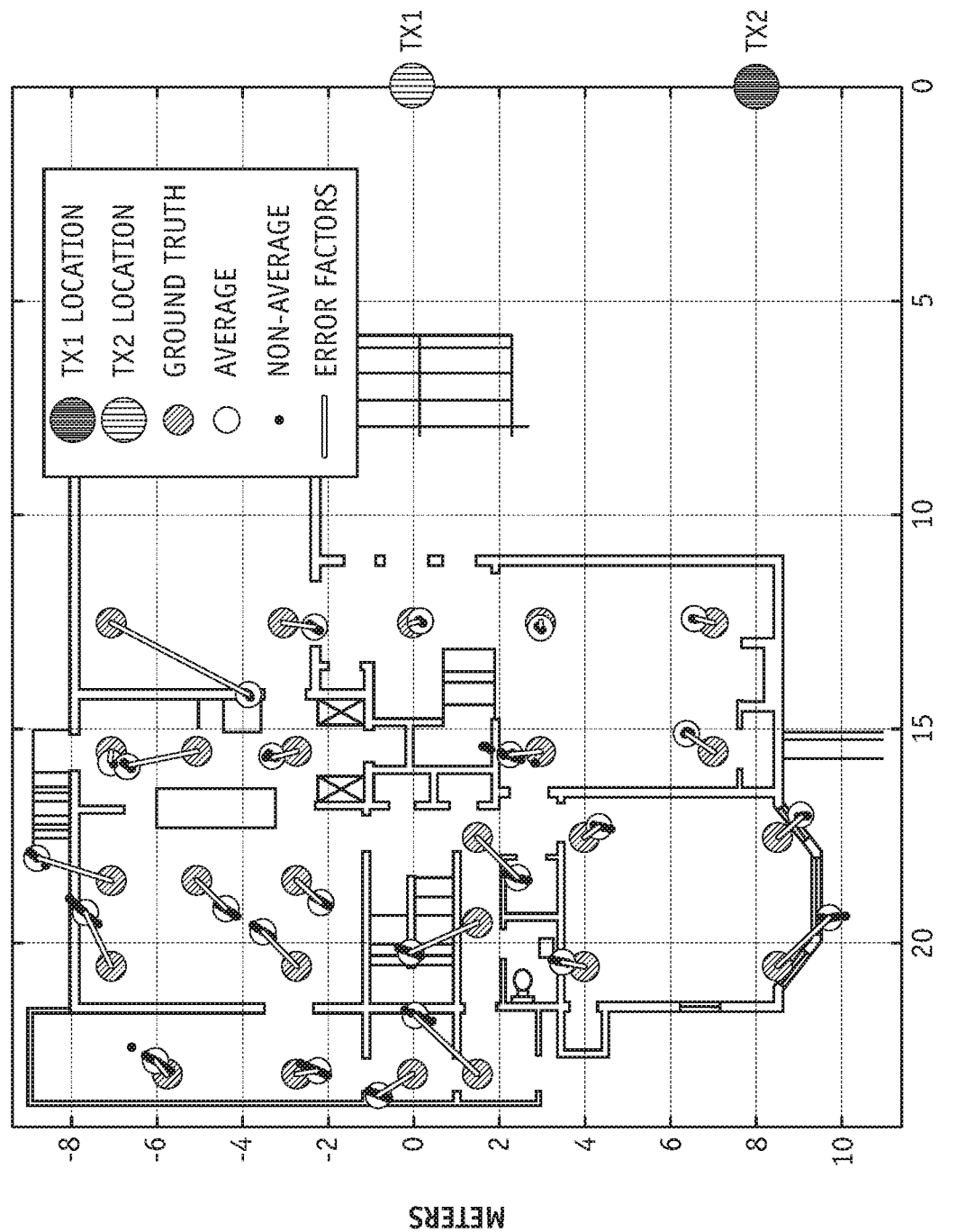

FIG. 5C shows the result of the repeatability measurements. It is observed that there are some small amounts of variability. Nevertheless, in most cases, the variability is small or insignificant relative to the average error found in FIG. 5C. Based on this analysis and field observations, it is found that the largest sources of error is due to measurement locations near large metallic household appliances in the kitchen (refrigerator) and laundry (washing/drying machines) areas, that support strong eddy-currents and strong secondary scattered magnetic fields.

3D Orientation-Invariant Range Dependence

Figure 6A:
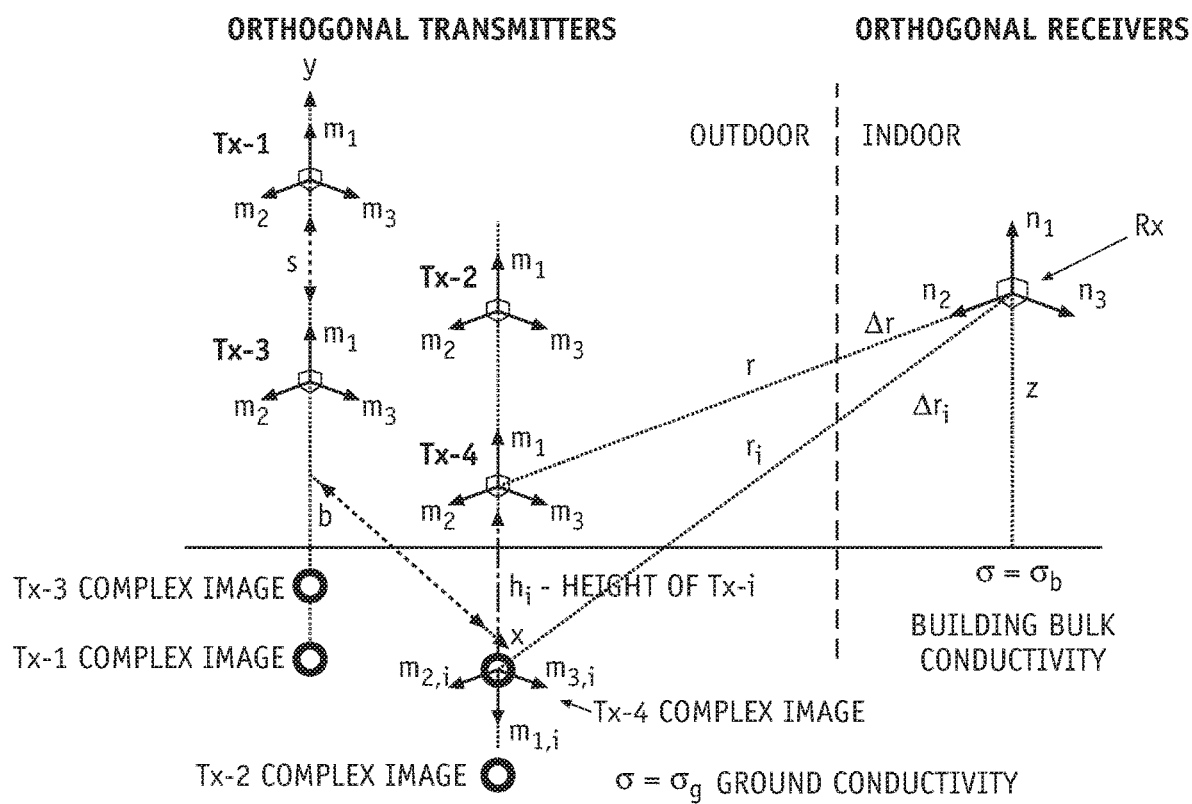
FIG. 6A shows an exemplary measurement arrangement according to an embodiment of the present disclosure.

FIG. 6A shows a measurement arrangement (600A) according to embodiments of the present disclosure. The measurement arrangement (600A) is overall similar to the one described with regards to FIG. 1, except that there is a 2×2 array of transmitting devices (Tx1, . . . , Tx4) are used outdoor for the arrangement (600A) of FIG. 6 to enable a more accurate 3D position sensing. Transmitting devices (Tx1, . . . , Tx4) are set up at different heights and the goal here is to analyze the results in three dimensions (3D) taking into account the height above the ground. In what follows, a model for this scenario is derived and some measurement results highlighting the performance of such model is described in detail.

For 3D applications, in order to derive an orientation-invariant range dependent formula, some conversions and simplifications to Equation (2) may be applied. For simplicity, it is assumed $[3]^2 = \{1,2,3\} \times \{1,2,3\}$ and $c = -j\omega\mu_0 a/4\pi \cdot e^{-\alpha\kappa\Delta r}$. With reference to the embodiments of FIGS. 1 and 3, it is assumed that the distance between the transmitting and receiving devices is far enough to allow $e^{-\alpha\kappa\Delta r} \approx e^{-\alpha\kappa\Delta r_i}$. Let $\hat{m}_1, \hat{m}_2, \hat{m}_3$ be the unit vectors in the direction of the transmitter's magnetic moments. Similarly, $\hat{n}_1, \hat{n}_2, \hat{n}_3$ are the unit vectors in the direction of the receiver's magnetic moments. Observe both $\hat{n}_1, \hat{n}_2, \hat{n}_3$ and $\hat{m}_1, \hat{m}_2, \hat{m}_3$ form rotated permutations of the standard basis. Such a basis preserves the magnitude and angle between all vectors of $R^3$, i.e. we have $v \cdot u = (\hat{n}_1 \cdot v, \hat{n}_2 \cdot v, \hat{n}_3 \cdot v) \cdot (\hat{n}_1 \cdot u, \hat{n}_2 \cdot u, \hat{n}_3 \cdot u)$ for all $v, u \in R^3$. Based on such observation, the following can be derived:

$$V_{m \to n}^2 = \frac{c^2}{r^6} \sum_{\forall (i,j) \in [3]^2} (3(\hat{m}_i \cdot \hat{r})(\hat{n}_j \cdot \hat{r}) - (\hat{m}_i \cdot \hat{n}_j))^2 = \frac{6c^2}{r^6} \quad (4)$$

Similar calculations show $V_{m^i \to n}^2 = 6c^2/r_i^6$. Power measured by the receiver is given by:

$$P = \sum_{\forall (i,j) \in [3]^2} \left(V_{m_i \to n_j} + V_{m^i \to n_j}\right)^2 = \frac{6c^2}{r^6} + \frac{6c^2}{r_i^6} + 2 \sum_{\forall (i,j) \in [3]^2} V_{m_i \to n_j} V_{m^i \to n_j} \quad (5)$$

Let $\theta$ be the elevation angle of $\vec{r}$, i.e. the angle between $\vec{r}$ and the xy-plane, similarly let $\theta_i$ be the elevation angle of $\vec{r}_i$. Geometry shows that $r \cos \theta = r_i \cos \theta_i$. For further simplification a temporary notation is introduced as $f(v) = (1, 1, -1) \cdot v$. Using this notation, it can be observed that $\vec{r} \cdot f(\vec{r}) = \cos(2\theta)$ and $\vec{r}_i \cdot f(\vec{r}_i) = \cos(2\theta_i)$. Because both $\hat{r}$ and $\hat{r}_i$ point towards the receiver, we can deduce $(\vec{r} \cdot \vec{r}_i)$ $(\vec{r} \cdot f(\vec{r}_i)) = \cos(\theta_i + \theta)\cos(\theta_i - \theta)$. Hence, $$\sum_{\forall (i,j) \in [3]^2}' V_{m_i \to n_j} V_{m^i \to n_j} = c^2 \frac{3(\cos^2 \theta + \cos^2 \theta_i - 1) + 1}{r^3 r_i^3} \quad (6)$$

$$\frac{P}{c^2} = \frac{6}{r^6} + \frac{6}{r_i^6} + \frac{6(1 + r^2/r_i^2)\cos^2\theta - 4}{r^3 r_i^3}.$$

Description of Measurement Configuration

An experiment was conducted at the same >8000 square foot residential building in West Los Angeles (as described with regards to FIG. 3), but on the back side of the house. The same transmitting device driver electronics used in the embodiment described previously with regards to FIG. 3 is used here to drive high-current signals into the antennas. However, the antenna coils were built by wounding 12 AWG Magnet wire 30-40 turns around a 2"×12"×12" cube made out of ¼"-thick acrylic sheets. With these new antennas, the transmitting devices can generate MQS fields with a maximum range of 75 m when powered at 30V. Each node transmitted three unique MQS fields from its orthogonal coils, with frequencies ranging from 55.9 to 171.6 kHz. The mobile receiving device antenna was also modified to limit the self-coupling between the three receiving device coils. This was achieved by assembling 10 planar ferrite cores together and wounding about 150 turns of 32 AWG magnet wire around each side. By integrating the three coils together in a cube-like fashion, the coils were completely orthogonal to each other, greatly reducing the mutual inductance between the loops (up to 12 dB improvement).

Figure 6B:
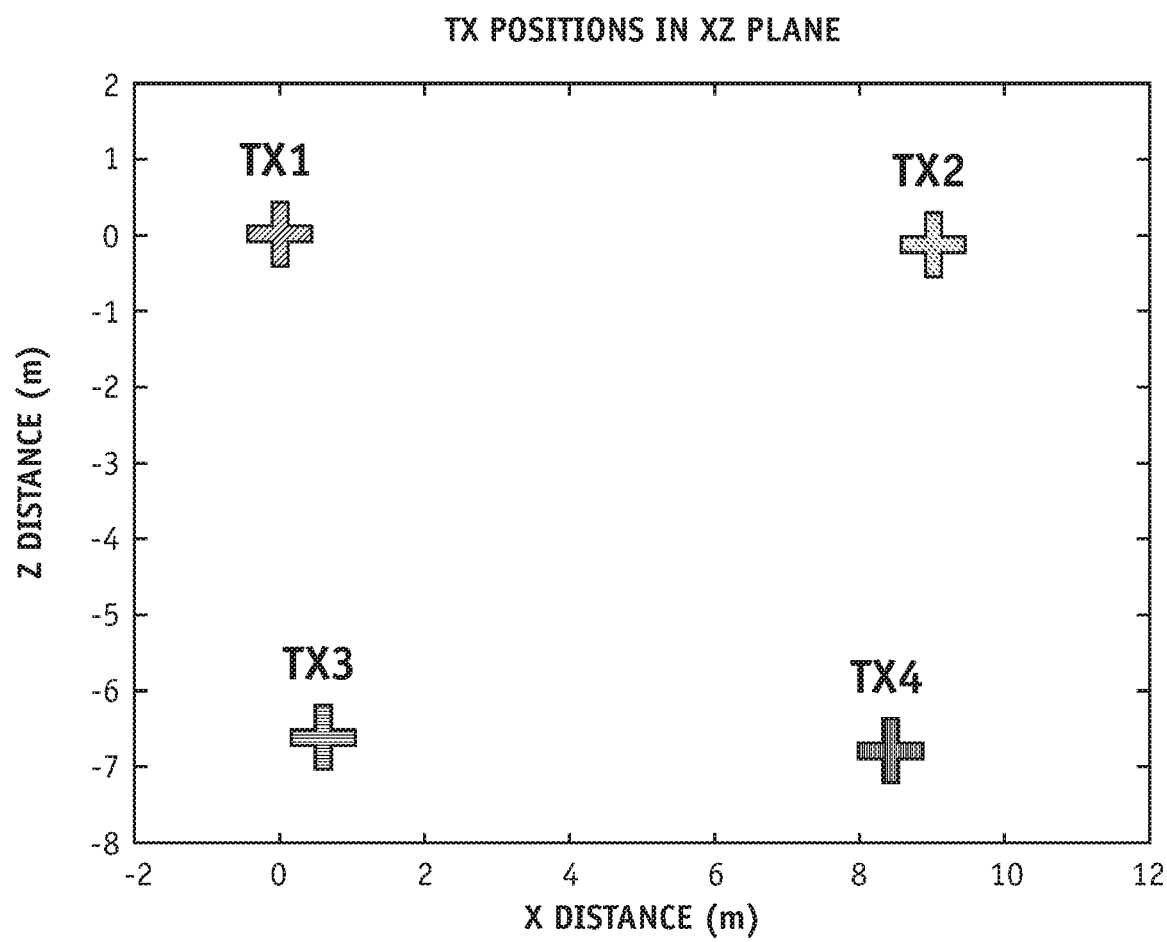
FIG. 6B shows an exemplary arrangement of transmitting devices according to an embodiment of the present disclosure.

Continuing with the 3D experiment, four tri-axial transmitter nodes were fixed in a vertical rectangular configuration, as shown in FIG. 6B, on a trailer positioned about 5 m away from the back side of the house. Two transmitters were raised up 7.5 m above the ground using the trailer's antenna masts. The remaining two transmitters were placed directly underneath on the trailer beam at about 1 m above the ground. The horizontal baseline distance between the transmitters on the masts was roughly 9 m, while the distance between the transmitters on the beams is 8 m. According to embodiments of the present disclosure, the rectangular configuration of the transmitters may be in a plane parallel to the outside wall of the residential building.

Figure 6C:
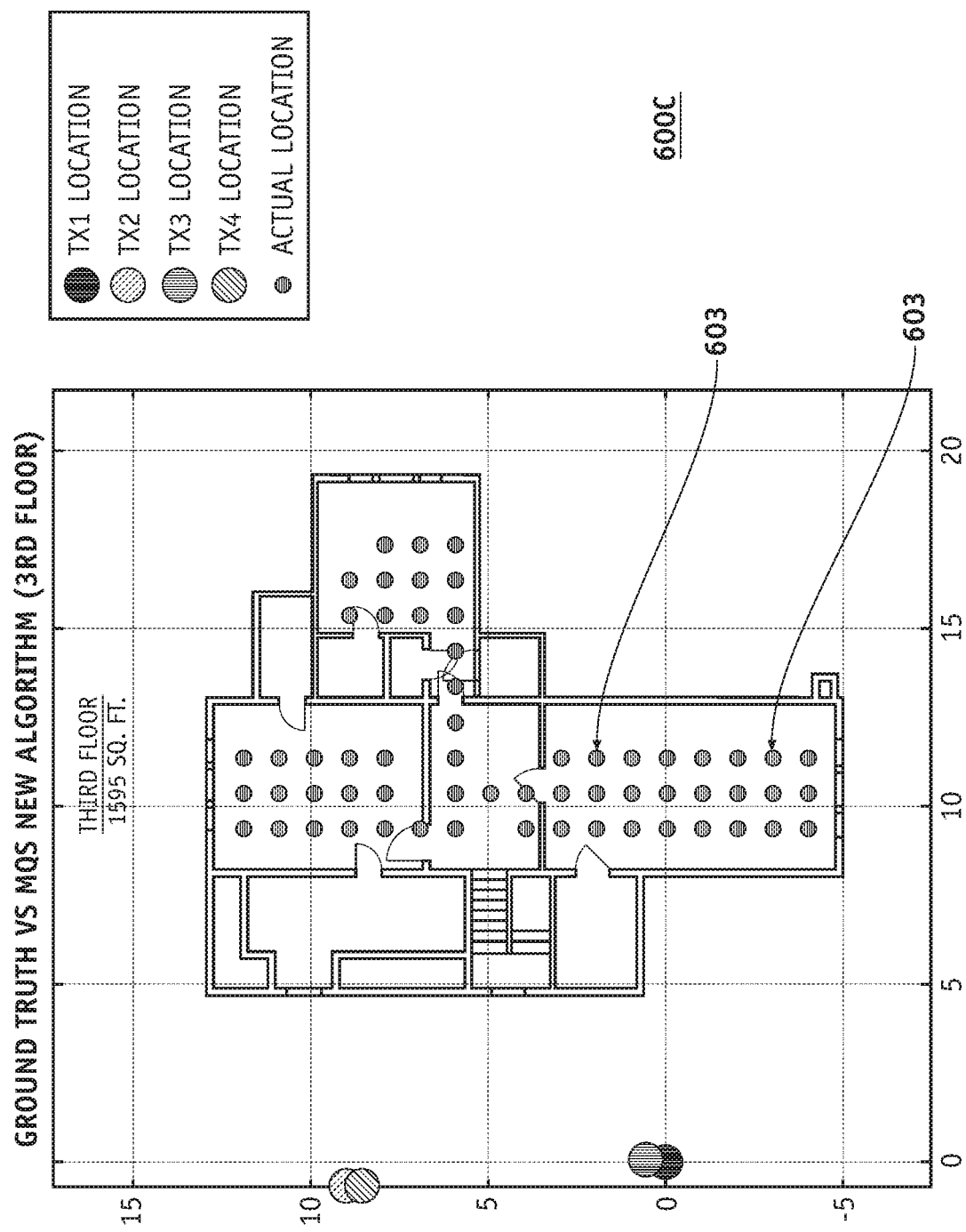
FIG. 6C shows an exemplary measurement arrangement according to an embodiment of the present disclosure.

FIG. 6C shows measurement arrangement (600C) for the 3D experiment in accordance with embodiments of the present disclosure. Each transmitting device position was surveyed using a Leica Flexline TS06 Laser Total Station to precisely measure their relative 3D locations from the Leica's reference point. On each of the three floors of the house, a visible reference point was marked and measured to also determine the 3D position relative to the Leica. From these floor reference points, 270 interior locations (603) spaced equally by 1 m were carefully measured and marked on all three floors of the house. With these reference measurements collected by the Leica, the transmitting devices locations and marked locations inside the house were all translated to the same coordinate system to confirm ground truths. FIG. 6C shows the ground truth locations of the four outdoor transmitter nodes on the trailer and all locations (603) on the $3^{rd}$ floor of the house where data was collected. At each of the 270 interior locations (603), the receiving device sampled and processed the field measurements of all four transmitting devices. The data was immediately streamed to the connected laptop and saved using MATLAB®.

Linear and Non-Linear Inversion Approaches

Due to the complexities of the full equation that characterizes the MQS fields in 3-dimensions, the range inversion can only be solved nonlinearly when high accuracy is needed via careful consideration of precise locations of the reference nodes. The Levenberg-Marquardt Algorithm may be used for this purpose. A gain constant $C_{sg}$ and a ground depth constant $\alpha$ for each transmitter and rewrote Equation (2) in terms of x, y, and z may be introduced.

Let $\rho = \sqrt{\Delta x^2 + \Delta y^2}$, $\theta = \tan^{-1}\left(\frac{\Delta z - h}{\rho}\right)$, $r = \sqrt{\rho^2 + (\Delta z - h)^2}$, and $r_i = \sqrt{\rho^2 + (\Delta z + h + \alpha)^2}$.

Then the following can obtained:

$$P = C_{sg}\left[\frac{1}{r^6} + \frac{1}{r_i^6} + \frac{(1 + r^2/r_i^2)\cos^2\theta - 2/3}{r^3 r_i^3}\right] \quad (7)$$

With reference to equation (7), in accordance with the teachings of the present disclosure, using the measured powers from all four transmitter nodes and their stationary locations as the inputs, the Levenberg-Marquardt Algorithm is able to directly optimize for and output a precise position of the receiver.

To obtain a linear version of the problem we simplify the problem by allowing $r_i \approx \sqrt{r^2 + \alpha(\alpha+2h)^2}$ and therefore the following can be obtained:

$$P \approx C_{sg}\left[\frac{1}{r^3} + \frac{1}{r_i^3}\right], \quad (8)$$

Equation (8) is an under-approximation, but it is simplified to a function of just one variable r. Using four transmitters in a rectangular configuration, it is possible to obtain coordinates of the receiver. It is simple to write equations for $r_1$, $r_2$, $r_3$, and $r_4$ in terms of x, y, and z. Using only simple algebraic manipulation, one can derive the equations below:

$$z = \frac{1}{4h}(r_1^2 + r_2^2 - r_3^2 - r_4^2 + 2h^2), \quad (9)$$

$$x = \frac{1}{2D}(D^2 + r_1^2 - r_2^2), \, y = \left|\sqrt{r_1^2 - x^2 - z^2}\right|$$

Here, D is the distance between transmitter 1 and transmitter 2. Data was gathered to test the accuracy of the Levenberg-Marquardt Algorithm and the linear approximation. In what follows, the results are described in detail.

Field Power and Range Dependence Analysis

Figure 7A:
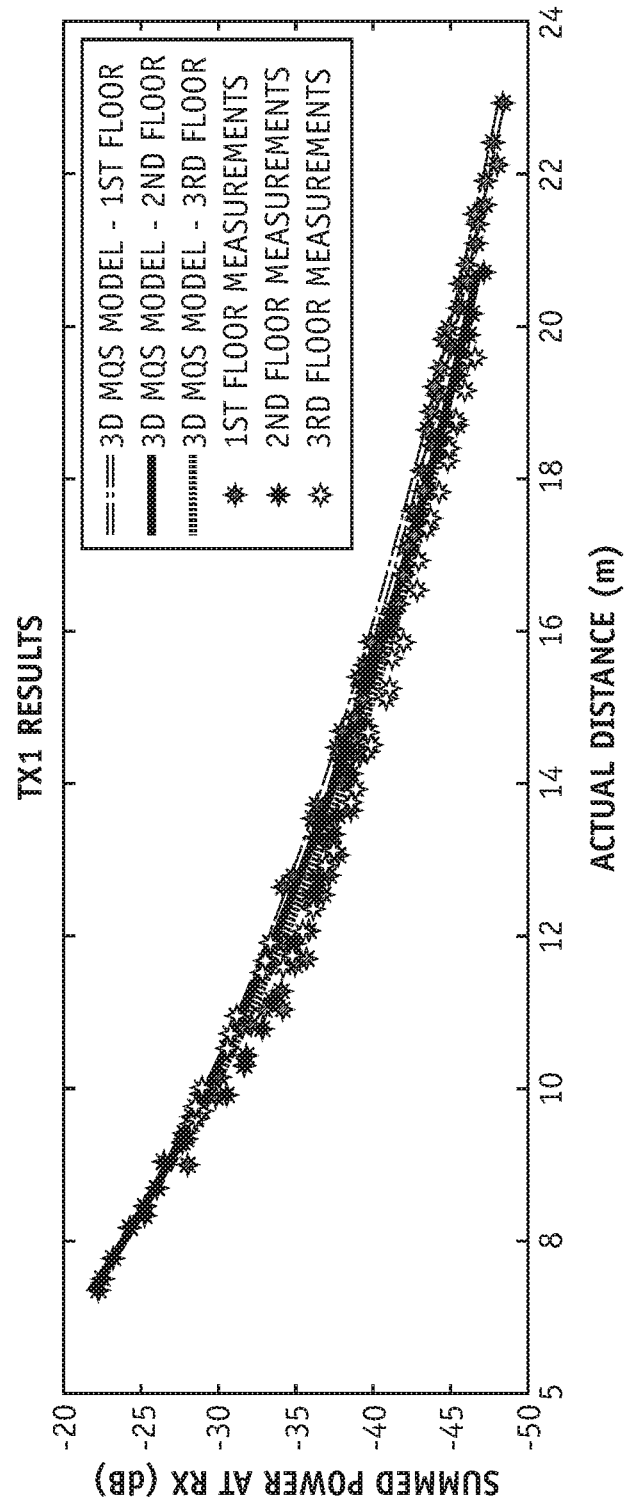
FIGS. 7A-7E show exemplary measurement results according to embodiments of the present disclosure.

With reference to FIG. 6C, at each surveyed location (603), the receiving device measured the three unique fields generated per transmitting device in each of its own orthogonal coils, resulting in nine total power components saved for each respective transmitting device. This 3×3 matrix of field power measurements is summed together and plotted as a function of the actual distance from the transmitting node as shown in FIG. 7A. Using a weighted least-squares optimization solver on the collected data, the constants $C_{sg}$ and $\alpha$ for in equation (7) are determined for each transmitter and are listed below:

$C1=1, \alpha1=3$ $C2=1, \alpha2=6.1578$ $C3=1, \alpha3=11.8503$ $C4=1, \alpha4=14.4662$ Each solid curve in FIG. 7A represents the range inversion from the powers measured using the optimized constants on each respective floor. Measured values vs distance and corresponding to each solid curve are also shown. Both values obtained from the model and the measured values correspond to transmitting device (Tx1). The full equation accounts for the height from the ground and is able to closely characterize the fields using the same constants irrespective of which floor it is on, as shown by the plotted results in FIG. 7A.

Figure 7B:
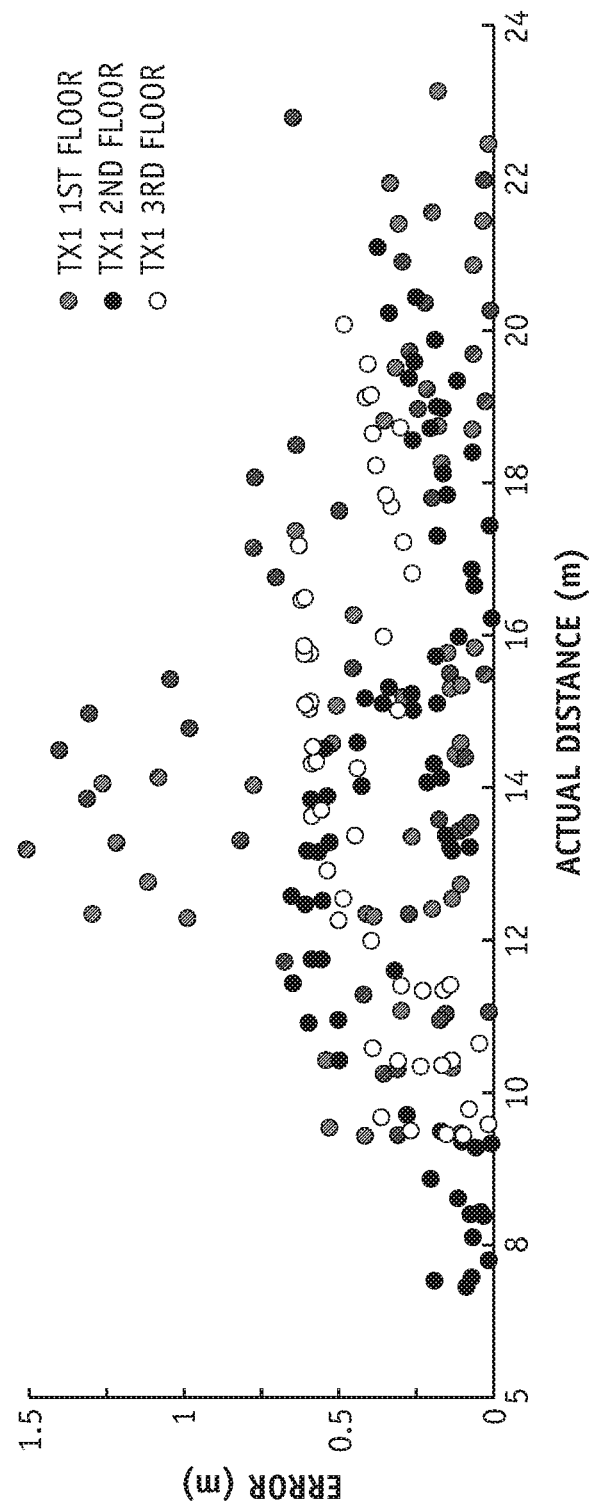

FIG. 7B shows the errors in range inversion at various distances inside the house. It can be noticed that the measurements on the first floor, have the highest range error compared to the second and third floors. This was consistent across all four transmitting devices, which may be due to metal appliances and other sources of environmental perturbations located on the first floor.

3D Position Sensing Results and Analysis

With the simplified linear approximation (equations 8-9), the range from each transmitting device can be directly calculated. Due to the approximations made to remove the height dependence, the gain constants need to be re-optimized to account for the new generalization model. From the data collected on all three floors, the optimized constants for the simplified model (using the same $\alpha$ ground constants) are listed below:

$C1=0.44787, \alpha1=3$ $C2=0.50837, \alpha2=6.16$ $C3=0.55996, \alpha3=11.85$ $C4=0.60395, \alpha4=14.47$ Inserting these constants into Equation 8, power measurements can be directly inverted into ranges from each transmitter. Knowing the rectangular configuration of the transmitters, simple trilateration and trigonometric techniques are used to solve for the relative X, Y, Z positions of the receiving device, with respect to an external reference point (in this case transmitting device (Tx1). Using the predetermined height difference, h, between transmitting devices (Tx1, Tx3) and the calculated range from each transmitter ($r_1$, $r_3$), the Z-position is calculated using the law of cosines. The same process is completed with transmitting devices (Tx2, Tx4) and averaged with the previous height result. The resulting height sensing equation simplifies to:

$$z = \frac{r_1^2 + r_2^2 - r_3^2 - r_4^2 + 2h^2}{4h} \quad (10)$$

With the solved Z-position and ranges from the horizontal transmitting devices (Tx1, Tx2), the 2-D X and Y positions can be solved with these equations:

$$x = \frac{D^2 + r_1^2 - r_2^2}{2D}, \, y = \left| \sqrt{|r_1^2 - x^2 - z^2|} \right| \quad (11)$$

Figure 7C:
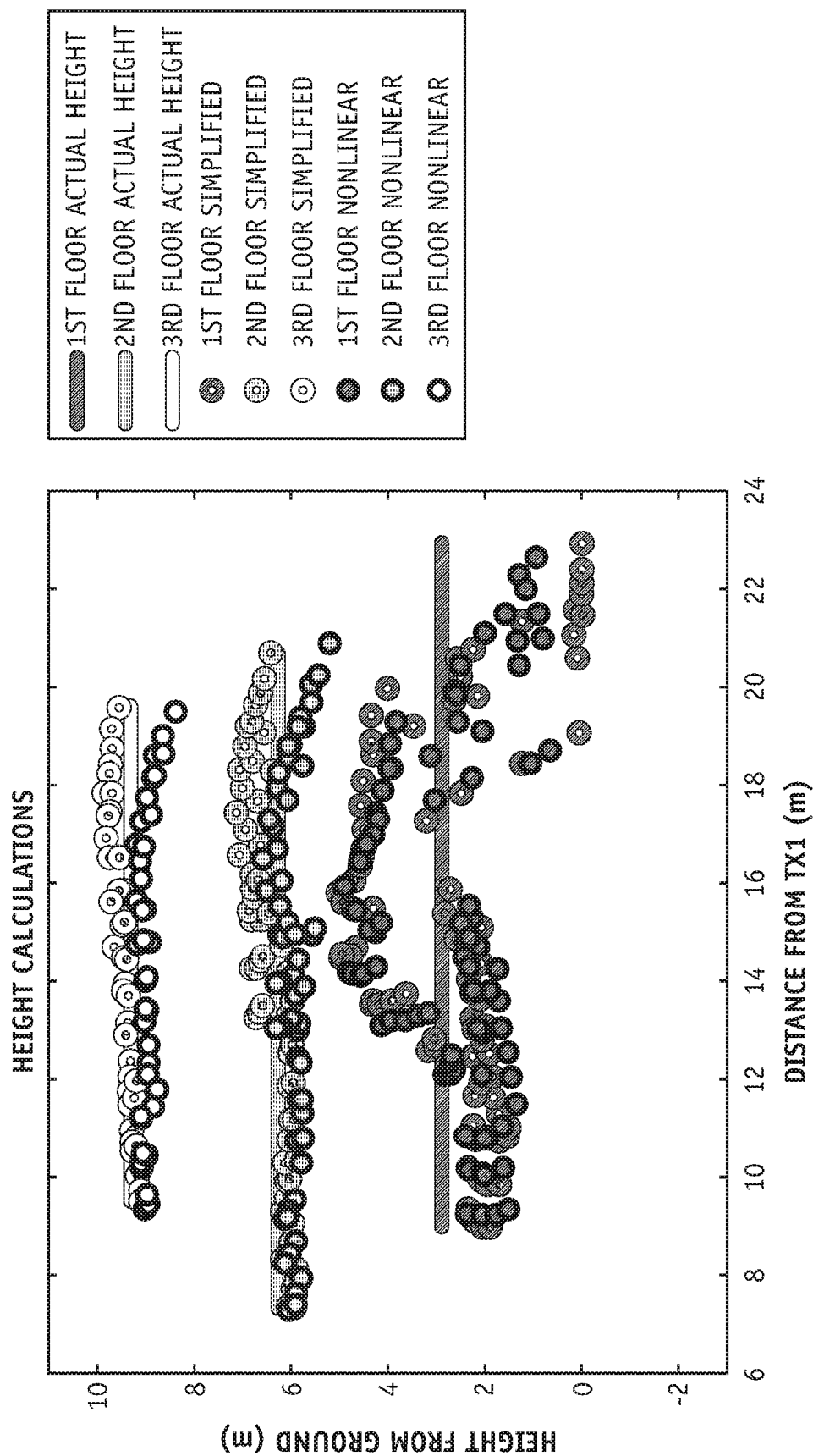

FIG. 7C shows the height calculated from using both the Simplified and Nonlinear techniques. From the plot it can be noticed that the errors on the first floor consistently has the highest errors, which can also be verified from the power measurements of transmitting device (Tx1) in FIG. 7B. There are instances on the first floor where the Z error can be significant enough to produce ambiguous floor sensing. For example, the maximum Z-position error reaches 2.895 m which could overlap the $2^{nd}$ floor threshold and produce an incorrect floor result. Since the 2D position tracking depends on the height calculated, these height sensing errors can propagate into the position inversion results.

Figure 7D:
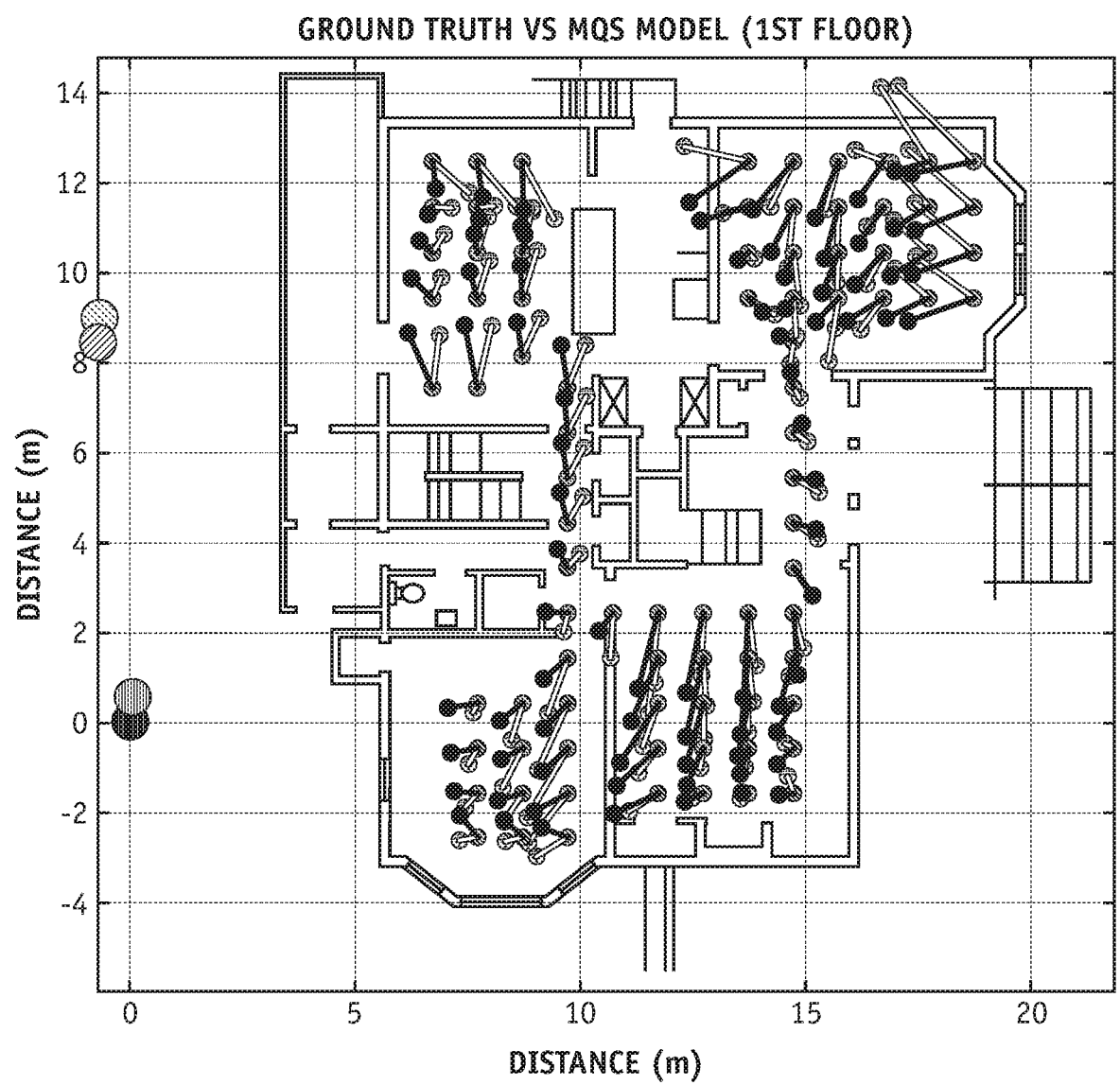
Figure 7E:
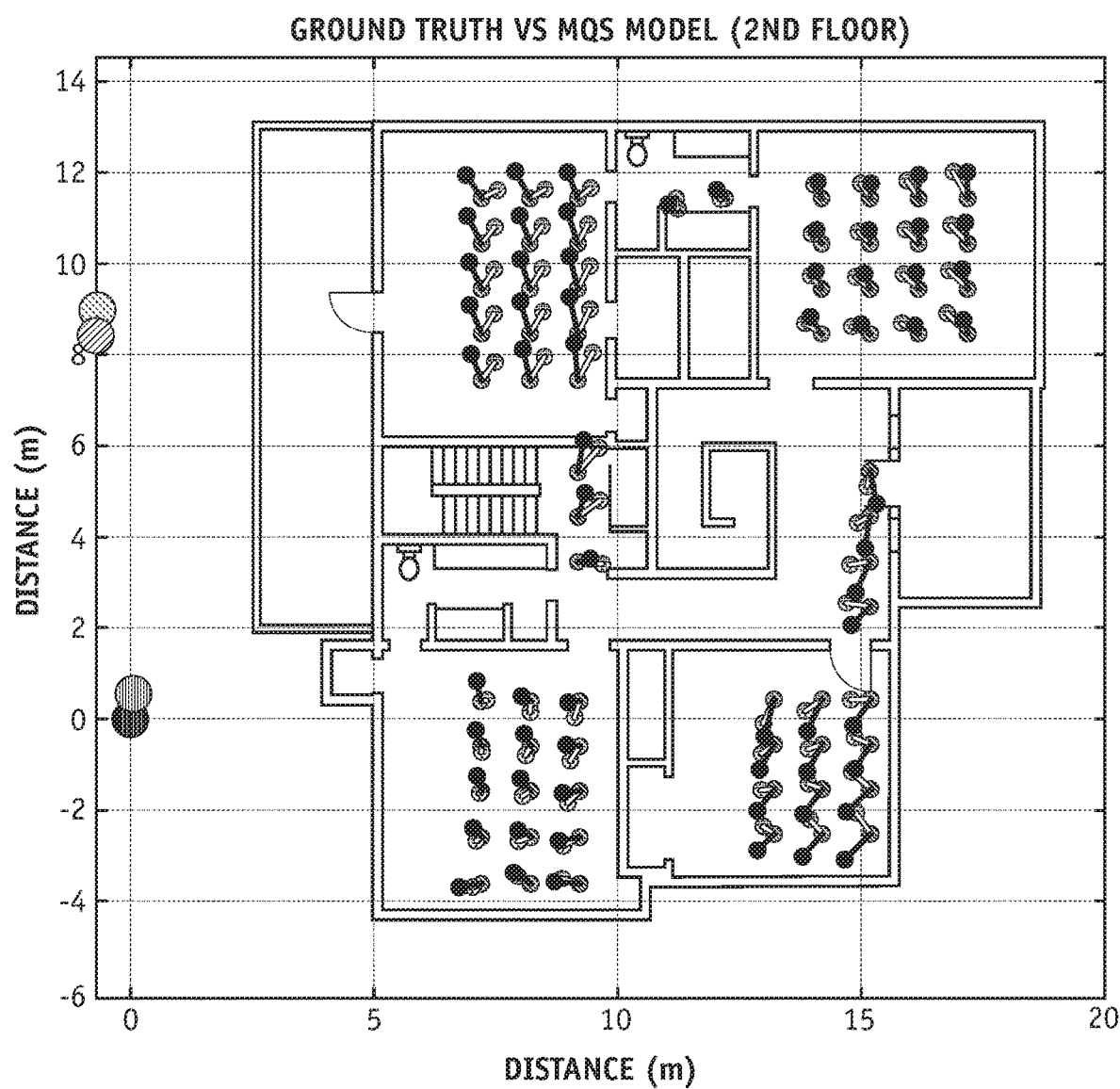

FIGS. 7D-7E show the inverted 2D position results between for simplified linear and nonlinear solutions for the first and second floor respectively. The actual ground-truth position of the measurement collected is also shown. FIG. 8 shows table (800) summarizing the average errors in each dimension for each of the techniques (simplified and nonlinear) used. Analyzing the overall errors of both approaches, it can be generalized that the non-linear has improved X and Y errors but at the expense of adding Z error. The simplified model works well in directly solving for 3D position using a closed-form solution with comparable results as the nonlinear solver.

According to various embodiments of the present disclosure:

One or more receiving devices and one or more transmitting devices may be used in any of the systems and measurement arrangements described throughout the present disclosure.

The one or more receiving devices may comprise one or more mobile and/or one or more fixed receiving devices.

The one or more transmitting devices may comprise one or more mobile and/or one or more fixed transmitting devices.

The position of the one or more transmitting devices may be calculated with reference to a fixed receiver of the one or more receiving devices.

The fixed receiver used as the reference may be relocated from one reference location to another as long as the relative positions of the reference locations with respect to one another are known.

The position of the one or more transmitting devices may be calculated with reference to the location of two or more receiving devices.

While the technique utilizing either linear or non-linear solution exemplified previously applies true-range multilateration with two (for two dimensional) or more (for three-dimensional), it is noted that: 1) angular/orientation invariant range dependence is particularly required for this and obtained by summing all orthogonal components of transmit to receive couplings, and that 2) two-dimensional and three-dimensional solutions can also be found by solving the multi-axial orthogonal components (referred herein as MSNA to denote multi-axial single-node) through partial ratio of partial sums for orientation or direction angles, and summed components for range, therefore providing up to three-dimensional position and orientation with as few as a single reference orthogonal node outside the building.

The benefit of the multi-node true-range multilateration technique is the simplicity in algorithms and calibrations, and very low coupling between orientation errors and position errors, however, the MSNA technique has the benefit of single node implementation, which is also simpler for system deployment and lower cost at the expense of more complex algorithms. A physics-based limitation in MSNA is that it is not possible to exactly decouple the complex (and if strong) secondary fields from both the ground and building. As a result, there are three exact solution regimes within which the solutions for MSNA can be found to be most accurate:

1. Distance from outer wall to mobile device inside building is approximately less than one bulk-building skin depth ($\Delta r \tilde{<} \delta_b$), where $\delta_b = \sqrt{2/\omega\mu\sigma_b}$ is the building bulk skin depth with $\sigma_b$ is the bulk building conductivity. Secondary currents or fields from building can be neglected.

2. Distance from base station or outer reference node to mobile device is approximately greater than distance from base station or outer reference node to ground complex image ($r \tilde{>} 2h + \delta_g$) where $\delta_g = \sqrt{2/\omega\mu\sigma_g}$ is the ground bulk skin depth with $\sigma_g$ is the bulk ground conductivity. Secondary currents or fields from ground can be neglected.

3. Distance from outer wall to mobile device is approximately less than one bulk-building skin depth and distance from base station or outer reference node to mobile device is approximately greater than distance from base station or outer reference node to ground complex image. In this case, both $\Delta r \tilde{<} \delta_b$ and $r \tilde{>} 2h + \delta_g$ is satisfied, however, system will have limited range, as frequency of operation is not optimized for maximum possible range. If we assume that $\Delta r \approx r - d$, where d is the distance inside the building, then solving the set of two requirements imply $2h + \delta_g \tilde{<} r \tilde{<} \delta_b + d$, which due to earth ground conductivity in the 0.1-10 mS/m imply a very limited range of operation at best within the building. As a result, this regime is unlikely to be useful in most building or house environments.

In most cases noted above (1-3), the approximated MSNA solutions can be found by solving the previously presented coupling equations, given again for the voltage coupling between a single transmit and single receive element:

$$V_T \approx C_g e^{-\alpha\kappa\Delta r}[3(\hat{m}\cdot\hat{p})(\hat{n}\cdot\hat{p})C_\phi - \hat{m}\cdot\hat{n}] \times \left[\frac{1}{r^3} + \frac{1}{r_i^3}\right] \quad (12)$$

where the approach for solution involves obtaining a representation of all coupling from orthogonal transmit elements to receive elements. In total, 3×3=9 unique couplings can be found. To simplify the analysis for 2D (two-dimensional), the only need is to develop the 2×2=4 unique solutions that are sensitive to 2D position and orientations.

Applicant will focus on the two-dimensional (2D), x, y, ϕ, 3 degrees of freedom (DOF) problem for simplicity and proof of concept, which requires two orthogonal dipoles at the transmitter (TX) and receiver (RX) (2×2=4 field couplings). To permit linear sensitivity to position and orientation, the field couplings are rewritten in transmit-centric and receive-centric forms (see Ref. [1-2]) as follows:

$$F_{m1} = |V|_{(m1\to n1)}^2 + |V|_{(m1\to n2)}^2$$

$$F_{m2} = |V|_{(m2\to n1)}^2 + |V|_{(m2\to n2)}^2$$

$$F_{n1} = |V|_{(n2\to m1)}^2 + |V|_{(n2\to m2)}^2$$

$$F_{n2} = |V|_{(n2\to m1)}^2 + |V|_{(n2\to m2)}^2 \quad (13)$$

where $F_{m1}$ and $F_{m2}$ are the transmit-centric equations for the orthogonal transmitter TX 1 and 2 (m1,m2), which describe the total field power measured at all receivers RX(s) due to each TX, and $F_{n1}$ and $F_{n2}$ are the receive-centric equations for orthogonal receivers RX 1 and 2 (n1,n2), which describe the total power of all transmitters TX(s) measured at each receiver RX (see Ref. [1-2]).

To obtain ranging that is orientation invariant, the contributions from both transmit centric equations are summed, as seen from Ref. [1]. For the present problem, this gives:

$$F_r = \left\{\begin{matrix}F_{m1}\\+F_{m2}\end{matrix}\right\} \approx 5C_g^2 \left[\frac{e^{-2\alpha\kappa\Delta r}}{r^3+r_i^3}\right]^2 = 5C_g^2\left[\frac{e^{-2\alpha\kappa H(r-d)}}{r^3+r_i^3}\right]^2 \quad (14)$$

where H is the Heaviside unit step function. Measurements of $F_r$ obtained from summing all measured powers from the 2×2 orthogonal coupling is then described by a range dependence as noted, and can be inverted for effective range to device, r, when suitable assumptions of the various constants are known ($C_g$, α, κ, $\delta_g$). This can be solved by numerical fitting, least square minimization or optimization, or similar for range to the device, r.

The angular direction and orientation is substantially simplified, as the various constants due to range and building or ground image is removed by ratio functions needed for orientation or direction as seen from Ref. [1-2] as example.

The angular direction to the receive device is given by (see for example Ref. [1]):

$$F_{\phi m} = \frac{5-3\cos(2\phi_{m1})}{5+3\cos(2\phi_{m1})}, \phi_m = \phi_{m1} = \frac{1}{2}\cos^{-1}\left[\frac{5-5\times {}^S F_{\phi m}}{3\times {}^S F_{\phi m}+3}\right] \quad (15)$$

The orientation of the receive device is given by (see for example Ref. [1]):

$$F_{\phi n} = \frac{5-3\cos(2\phi_{n1})}{5+3\cos(2\phi_{n1})}, \phi_n = \phi_{n1} = \frac{1}{2}\cos^{-1}\left[\frac{5-5\times {}^S F_{\phi n}}{3\times {}^S F_{\phi n}+3}\right] \quad (16)$$

It is noted that the 2D description above can be extended to 3D without loss of generality, and that further additional adjustments to this description can be made by simple manipulations of constants to provide suitable improvements in the fitting of this approximate simplified solution to the measurements obtained in the field. For the 2D example given above, 2D device position and 2D device relative orientation in Cartesian coordinate is obtained by simple transformations:

$x = r \cos\phi_n$ $y = r \sin\phi_n$ $\phi = \phi_m - \phi_n$

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose GPU).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

[1] D. D. Arumugam. Through-the-wall magnetoquasistatic ranging. *IEEE Antennas and Wireless Propagation Letters*, 16:1439-1442, 2017.
[2] D. Arumugam. Single-anchor 2d magnetoquasistatic position sensing for short to long ranges above ground. *Antennas and Wireless Propagation Letters, IEEE*, PP(99):1-1, 2015.
[3] D. D. Arumugam. Decoupled range and orientation sensing in long-range magnetoquasistatic positioning. *Antennas and Wireless Propagation Letters, IEEE*, 14:654-657, 2015.

The invention claimed is:

1. A long-range, through-the-wall position sensing method comprising:
providing one or more transmitting devices, each configured to transmit quasistatic magnetic fields along one or more transmitting axes;
providing at least one receiving device configured to receive quasistatic magnetic fields along one or more receiving axes;
placing the one or more transmitting devices outside an enclosed space having an outer wall;
placing the at least one receiving device inside the enclosed space;
transmitting through the outer wall, by the one or more transmitting devices, the quasistatic magnetic fields in one or more frequency bands;
detecting, by the at least one receiving device, one or more quasistatic magnetic field couplings between each axis of each of the one or more transmitting axes and each axis of the one or more receiving axes;
based on the detected quasistatic magnetic fields, calculating orientation-invariant ranges between the at least one receiving device and each of the one or more transmitting devices, the calculating comprising contributions from complex images of the one or more transmitting devices, thereby accounting for induced eddy-currents in ground due to transmitted quasistatic magnetic fields, and wherein the contributions from complex images are based on a dependency of the detected quasistatic magnetic fields on an inverse of distances of the complex images from the at least one receiving device to a third power.

2. The long-range, through-the-wall position sensing method of claim 1, wherein the one or more transmitting axes are three orthogonal transmitting axes, and the one or more receiver axes are three orthogonal receiving axes.

3. The long-range, through-the-wall position sensing method of claim 1, wherein the calculating the orientation-invariant ranges comprises calculating a sum function based on the square of the detected quasistatic magnetic fields.

4. The long-range, through-the-wall position sensing method of claim 3, further comprising inverting the sum function to calculate the orientation-invariant ranges.

5. The long-range, through-the-wall position sensing method of claim 4, further comprising calculating a ground truth position of the at least one receiving device based on the calculated orientation-invariant ranges.

6. A two-dimensional system comprising at least two transmitting devices placed outside an enclosed space and at least one receiving device placed inside the enclosed space, the system configured to operate according to a method comprising:
providing one or more transmitting devices, each configured to transmit quasistatic magnetic fields along one or more transmitting axes;
providing at least one receiving device configured to receive quasistatic magnetic fields along one or more receiving axes;
placing the one or more transmitting devices outside an enclosed space having an outer wall;
placing the at least one receiving device inside the enclosed space;
transmitting through the outer wall, by the one or more transmitting devices, the quasistatic magnetic fields in one or more frequency bands;
detecting, by the at least one receiving device, one or more quasistatic magnetic field couplings between each axis of each of the one or more transmitting axes and each axis of the one or more receiving axes, and
based on the detected quasistatic magnetic fields, calculating orientation-invariant ranges between the at least one receiving device and each of the one or more transmitting devices, the calculating comprising contributions from complex images of the one or more transmitting devices, thereby accounting for induced eddy-currents in ground due to transmitted quasistatic magnetic fields,
wherein:
the at least two transmitting devices and the at least one receiving device are all at substantially same heights from ground, and
the calculating the ground truth position of the at least one receiving device comprises trilateration.

7. The two-dimensional system of claim 6, wherein the at least two transmitting devices are each located at a distance of more than 10m from the outer wall.

8. The two-dimensional system of claim 7, wherein the at least two transmitting devices are positioned in a distance of at least 8m from each other.

9. The two-dimensional system of claim 8, wherein the enclosed space is a house with a size of larger than 8000 ft$^2$.

10. A three-dimensional system comprising three or more transmitting devices placed outside an enclosed space and at least one receiving device placed inside the enclosed space, the system configured to operate according to method of claim 5.

11. The three-dimensional system of claim 10, wherein the three or more transmitting devices are four transmitting devices positioned in a rectangular configuration, and wherein a plane of the rectangle is parallel to the outer wall.

12. The three-dimensional system of claim 11, wherein the calculating the orientation-invariant ranges comprises
calculating a sum function based on the square of the detected quasistatic magnetic fields, and
inverting the sum function.

13. The three-dimensional system of claim 12, wherein the inverting the sum function is based on a non-linear algorithm to calculate the orientation-invariant ranges.

14. The three-dimensional system of claim 13, wherein the non-linear algorithm comprises one of a Levenberg-Marquardt algorithm, Gauss-Newton algorithm or gradient descent algorithm.

15. The three-dimensional system of claim 12, wherein the inverting the sum function is based on a linear method, and wherein the orientation-invariant ranges are calculated directly using powers received by the receiving device by each of the transmitting devices based on an analytical formula.

16. The three-dimensional system of claim 15, wherein a ground truth position of the at least one receiving device is directly calculated based on analytical formulae including the orientation-invariant ranges and a dimension of the rectangle.

17. The long-range, through-the-wall position sensing method of claim 1, wherein the one or more frequency bands include frequencies in the range of tens or hundreds of kHz.

18. The long-range, through-the-wall position sensing method of claim 5, wherein the at least one receiving device comprises one or more mobile receiving devices, and wherein the calculating the position is performed for the one or more mobile receiving devices.

19. The long-range, through-the-wall position sensing method of claim 1, wherein the one or more transmitting devices comprise one or more mobile transmitters, and wherein the at least one receiving device comprises two or more fixed receivers, the method further comprising calculating a location of the one or more mobile transmitting devices relative to the two or more fixed receivers.

20. The long-range, through-the-wall position sensing method of claim 1, wherein the one or more transmitting devices comprises one or more mobile transmitters, and wherein the at least one receiving device comprises two or more fixed receivers, the method further comprising calculating a location of the one or more mobile transmitters relative to a reference fixed receiver of the two or more fixed receivers, the reference fixed receiver being movable from a first reference location to a second reference location upon knowledge of a relative position change of the second reference location to the first reference location.

21. A long-range, through-the-wall position and orientation sensing method comprising:
providing a transmitting device configured to transmit quasistatic magnetic fields along one or more transmitting axes;
providing one or more receiving devices configured to receive quasistatic magnetic fields along one or more receiving axes of each of the one or more receiving devices;
placing the transmitting device outside an enclosed space having an outer wall;
placing the one or more receiving devices inside the enclosed space;
transmitting through the outer wall, by the transmitting device, the quasistatic magnetic fields in one or more frequency bands;
detecting, by each of the one or more receiving devices, one or more quasistatic magnetic field couplings between each axis of each of the transmitting device and each axis of the one or more receiving axes of the one or more receiving devices, and
based on the detected quasistatic magnetic fields, calculating:
ranges between the transmitting device and each of the one or more receiving devices;
angular directions to each of the one or more receiving devices;
orientation of each of the one or more receiving devices, and
contributions from a complex image of the transmitting device, thereby accounting for induced eddy-currents in ground due to transmitted quasistatic magnetic fields, and wherein the contributions from complex images are based on a dependency of the detected quasistatic magnetic fields on an inverse of distances of the complex images from the at least one receiving device to a third power.

22. The long-range, through-the-wall position and orientation sensing method of claim 21, wherein the one or more transmitting axes are three orthogonal transmitting axes, and the one or more receiver axes of each of the one or more receiving devices are three orthogonal receiving axes.

23. The long-range, through-the-wall position and orientation sensing method of claim 21, wherein the calculating the ranges comprises calculating a sum function based on the square of the detected quasistatic magnetic fields.

24. The long-range, through-the-wall position and orientation sensing method of claim 23, further comprising inverting the sum function to calculate the ranges.

25. The long-range, through-the-wall position and orientation sensing method of claim 24, further comprising calculating a position of the receiving device based on the calculated ranges.

26. The long-range, through-the-wall position and orientation sensing method of claim 24, wherein the calculating of the angular directions and the orientations is based on ratio functions defined based on selected numbers of the detected quasistatic magnetic fields.

* * * * *